United States Patent
Chen et al.

(10) Patent No.: US 9,491,777 B2
(45) Date of Patent: Nov. 8, 2016

(54) TECHNIQUES FOR PRIORITIZING THE REPORTING OF UPLINK CONTROL INFORMATION FOR CELLS UTILIZING CONTENTION BASED RADIO FREQUENCY SPECTRUM

(71) Applicant: QUALCOMM Incorporated, San Diego, CA (US)

(72) Inventors: Wanshi Chen, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 14/522,822

(22) Filed: Oct. 24, 2014

(65) Prior Publication Data
US 2015/0201429 A1    Jul. 16, 2015

Related U.S. Application Data

(60) Provisional application No. 61/926,181, filed on Jan. 10, 2014.

(51) Int. Cl.
*H04W 72/12*     (2009.01)
*H04W 74/00*     (2009.01)

(52) U.S. Cl.
CPC ..... *H04W 72/1242* (2013.01); *H04W 72/1226* (2013.01); *H04W 72/1284* (2013.01); *H04W 74/00* (2013.01)

(58) Field of Classification Search
CPC .............. H04W 72/1242; H04W 72/1226; H04W 72/1284; H04W 74/00
See application file for complete search history.

(56) References Cited

U.S. PATENT DOCUMENTS

| 2012/0039252 | A1 | 2/2012 | Damnjanovic et al. |
| 2012/0140708 | A1* | 6/2012 | Choudhury ......... H04W 72/082 370/328 |
| 2012/0207047 | A1 | 8/2012 | Liao et al. |
| 2012/0220286 | A1 | 8/2012 | Chen et al. |

(Continued)

FOREIGN PATENT DOCUMENTS

EP    2595333 A2    5/2013

OTHER PUBLICATIONS

3GPP, "3rd Generation Partnership Project; Technical Specification Group Radio Access Network; Evolved Universal Terrestrial Radio Access (E-UTRA); Physical Layer Procedures (Release 12)," 3GPP TS 36.213, v12.0.0 (Dec. 2013), Technical Specification, Dec. 2013, pp. 1-186, 3rd Generation Partnership Project, Valbonne, FR.

(Continued)

*Primary Examiner* — Mohammad Anwar
(74) *Attorney, Agent, or Firm* — Holland & Hart LLP

(57) ABSTRACT

Methods and apparatuses are described for wireless communication. One method may include identifying a conflict for a resource in an uplink subframe, where the conflict includes at least a conflict between reporting first uplink control information for a first cell and reporting second uplink control information for a second cell; prioritizing, in the conflict for the resource in the uplink subframe, the reporting of uplink control information based at least in part on whether at least one of the first cell and the second cell utilizes a contention based radio frequency spectrum; and transmitting uplink control information based on the prioritization.

30 Claims, 18 Drawing Sheets

(56) References Cited

U.S. PATENT DOCUMENTS

| | | | |
|---|---|---|---|
| 2012/0294269 A1* | 11/2012 | Yamada | H04L 1/1864 370/329 |
| 2013/0114455 A1 | 5/2013 | Yoo et al. | |
| 2013/0121299 A1 | 5/2013 | Kim et al. | |
| 2013/0148613 A1 | 6/2013 | Han et al. | |
| 2013/0258874 A1 | 10/2013 | Khoshnevis et al. | |
| 2013/0258954 A1 | 10/2013 | Khoshnevis et al. | |
| 2013/0294382 A1* | 11/2013 | Xu | H04W 76/066 370/329 |
| 2014/0023054 A1* | 1/2014 | Yang | H04W 56/0045 370/336 |
| 2014/0119304 A1* | 5/2014 | Li | H04W 52/146 370/329 |

OTHER PUBLICATIONS

ISA/EPO, International Search Report and the Written Opinion of the International Searching Authority, Int'l App. No. PCT/US2014/072490, Apr. 9, 2015, European Patent Office, Rijswijk, NL, 11 pgs.

Kaneko et al., "Uplink Contention-Based CSI Feedback with Prioritized Layers for a Multi-Carrier System," IEEE Transactions on Wireless Communications, vol. 10, No. 12, Dec. 2011, pp. 4282-4293, Institute of Electrical and Electronics Engineers.

* cited by examiner

TECHNIQUES FOR PRIORITIZING THE REPORTING OF UPLINK CONTROL INFORMATION FOR CELLS UTILIZING CONTENTION BASED RADIO FREQUENCY SPECTRUM

CROSS REFERENCES

The present Application for Patent claims priority to U.S. Provisional Patent Application No. 61/926,181 by Chen et al., entitled "Techniques for Prioritizing the Reporting of Uplink Control Information for Cells Utilizing Contention Based Radio Frequency Spectrum," filed Jan. 10, 2014, assigned to the assignee hereof, which is hereby incorporated by reference in its entirety.

BACKGROUND

1. Field of the Disclosure

The present disclosure, for example, relates to wireless communication systems, and more particularly to techniques for prioritizing the reporting of uplink control information for cells utilizing contention based radio frequency spectrum.

2. Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

For example, a wireless multiple-access communication system may include a number of base stations, each simultaneously supporting communication for multiple user equipments (UEs, such as mobile devices). A base station may communicate with UEs on downlink channels (e.g., for transmissions from a base station to a UE) and uplink channels (e.g., for transmissions from a UE to a base station).

Some modes of communication with a UE may require communication over a plurality of channels (e.g., component carriers, two or more cells of a same frequency, etc.), with each channel being established between the UE and one of a number of cells that may utilize different component carriers (e.g., serving cells, which in some cases may be different base stations). When reporting uplink control information for the cells, there may be a conflict for a resource in an uplink subframe.

SUMMARY

The present disclosure, for example, relates to one or more techniques for prioritizing the reporting of uplink control information for cells utilizing contention based radio frequency spectrum. The prioritizing may be useful in resolving a conflict for a resource in an uplink subframe (e.g., a resource for reporting uplink control information). In some examples, the techniques may give priority to the reporting of uplink control information for a cell that utilizes contention based radio frequency spectrum (e.g., radio frequency spectrum for which apparatuses contend for access because the radio frequency spectrum is open to unlicensed use) over the reporting of uplink control information for a cell that utilizes contention-free based radio frequency spectrum (e.g., radio frequency spectrum for which apparatuses do not contend for access because the radio frequency spectrum is licensed to particular users for particular uses). In other examples, the techniques may give priority to the reporting of uplink control information for a cell that utilizes contention based radio frequency spectrum when the cell successfully contends for access to the contention based radio frequency spectrum for a period of time during which measurements are obtained to generate uplink control information for the cell.

In a first set of illustrative examples, a method for wireless communication is described. In one example, the method may include identifying a conflict for a resource in an uplink subframe. The conflict may include at least a conflict between reporting first uplink control information for a first cell and reporting second uplink control information for a second cell. The method may further include prioritizing, in the conflict for the resource in the uplink subframe, the reporting of uplink control information based at least in part on whether at least one of the first cell and the second cell utilizes a contention based radio frequency spectrum and transmitting uplink control information based on the prioritization.

In some examples, the method may include determining the second cell is a cell that utilizes contention based radio frequency spectrum, and prioritizing, in the conflict for the resource in the uplink subframe, the reporting of the second uplink control information for the second cell based at least in part on the utilization of the contention based radio frequency spectrum by the second cell. In some cases, the first cell and the second cell may be of different carrier frequencies. In other examples of the method, the first cell and the second cell may be of a same carrier frequency.

In some examples, the first uplink control information and the second uplink control information may each include channel state information (CSI). In these examples, a first priority level of a first reporting type of CSI for the first cell and a second priority level of a second reporting type of CSI for the second cell may be of a same priority level. Alternately, the method may include determining a first priority level of a first reporting type of CSI for the first cell; determining a second priority level of a second reporting type of CSI for the second cell; and prioritizing, in the conflict for the resource in the uplink subframe, the reporting of the second uplink control information for the second cell based at least in part on the first priority level of the first reporting type of CSI for the first cell relative to the second priority level of the second reporting type of CSI for the second cell. In some examples, the first reporting type of CSI for the second cell may have a higher priority level than the first reporting type of CSI for the first cell, and the method may further include prioritizing, in the conflict for the resource in the uplink subframe, the reporting of the second uplink control information for the second cell over the reporting of the first uplink control information for the first cell. In some examples, determining the first priority level of the first reporting type of CSI for the first cell and determining the second priority level of the second reporting type of CSI for the second cell may include: determining a top priority level when a reporting type of CSI comprises at least one of a rank indicator (RI), a precoding type indicator (PTI), or a wideband precoding matrix indicator (PMI); determining a medium priority level when the reporting type of CSI comprises at least one of a wideband channel quality indication (CQI), or a wideband CQI with PMI; and determining a low priority level when the reporting type of CSI comprises at least one of a subband CQI, or a subband CQI with PMI.

In some examples, the method may include determining the first cell is a cell that utilizes contention based spectrum; determining a first serving cell index of the first cell and a second serving cell index of the second cell, where the second serving cell index may be lower than the first serving cell index; and prioritizing, in the conflict for the resource in the uplink subframe, the reporting of the second uplink control information for the second cell based at least in part on the first serving cell index and the second serving cell index.

In some examples, the method may include identifying a downlink subframe of the second cell, during which measurements may be obtained to generate the second uplink control information. In these examples, the method may include lowering a priority of the reporting of the second uplink control information for the second cell when it is determined that a contention for the contention based radio frequency spectrum to transmit the downlink subframe failed. Also, or alternately, prioritizing the reporting of the second uplink control information for the second cell may include prioritizing the reporting of historic second uplink control information for the second cell, based on measurements obtained during receipt of a previous downlink subframe when it is determined that a contention for the contention based radio frequency spectrum to transmit the downlink subframe failed.

In some examples, the method may include including a second cell index with a reporting of the second uplink control information, the second cell index identifying the second cell.

In some examples, the method may include receiving signaling from a base station indicating a success or failure of a contention for the contention based radio frequency spectrum to transmit a downlink subframe by the second cell. In the same or other examples, the method may include detecting a success or failure of a contention for the contention based radio frequency spectrum to transmit a downlink subframe by the second cell. The detection may be performed based on a presence of a reference signal transmitted by the second cell.

In some examples, the method may include determining a type of the first uplink control information and the type of the second uplink control information, and prioritizing, in the conflict, the reporting of a subset of uplink control information based at least in part on the type of the first uplink control information and the type of the second uplink control information.

In some examples, the method may include determining the first cell is a cell that utilizes contention-free based radio frequency spectrum.

In some examples, the first uplink control information and the second uplink control information may include sounding reference signals (SRS). In the same or other examples, the first uplink control information and the second uplink control information may include scheduling request (SR) control information.

In a second set of illustrative examples, an apparatus for wireless communication is described. In one example, the apparatus may include means for identifying a conflict for a resource in an uplink subframe. The conflict may include at least a conflict between reporting first uplink control information for a first cell and reporting second uplink control information for a second cell. The apparatus may further include means for prioritizing, in the conflict for the resource in the uplink subframe, the reporting of uplink control information based at least in part on whether at least one of the first cell and the second cell utilizes a contention based radio frequency spectrum, and means for transmitting uplink control information based on the prioritization. In certain examples, the apparatus may further include means for implementing one or more aspects of the method for wireless communication described above with respect to the first set of illustrative examples.

In a third set of illustrative examples, another apparatus for wireless communication is described. In one example, the apparatus may include a processor, memory in electronic communication with the processor, and instructions stored in the memory. The instructions may be executable by the processor to identify a conflict for a resource in an uplink subframe. The conflict may include at least a conflict between reporting first uplink control information for a first cell and reporting second uplink control information for a second cell. The instructions may be further executable by the processor to prioritize, in the conflict for the resource in the uplink subframe, the reporting of uplink control information based at least in part on whether at least one of the first cell and the second cell utilizes a contention based radio frequency spectrum, and to transmit uplink control information based on the prioritization. In certain examples, the instructions may also be executable by the processor to implement one or more aspects of the method for wireless communication described above with respect to the first set of illustrative examples.

In a fourth set of illustrative examples, a non-transitory computer-readable medium storing computer-executable code for wireless communication is described. In one example, the code is executable by a processor to identify a conflict for a resource in an uplink subframe. The conflict may include at least a conflict between reporting first uplink control information for a first cell and reporting second uplink control information for a second cell. The code may be further executable to cause the at least one processor to prioritize, in the conflict for the resource in the uplink subframe, the reporting of uplink control information based at least in part on whether at least one of the first cell and the second cell utilizes a contention based radio frequency spectrum, and to transmit uplink control information based on the prioritization. In certain examples, the code may be further executable to cause the at least one processor to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
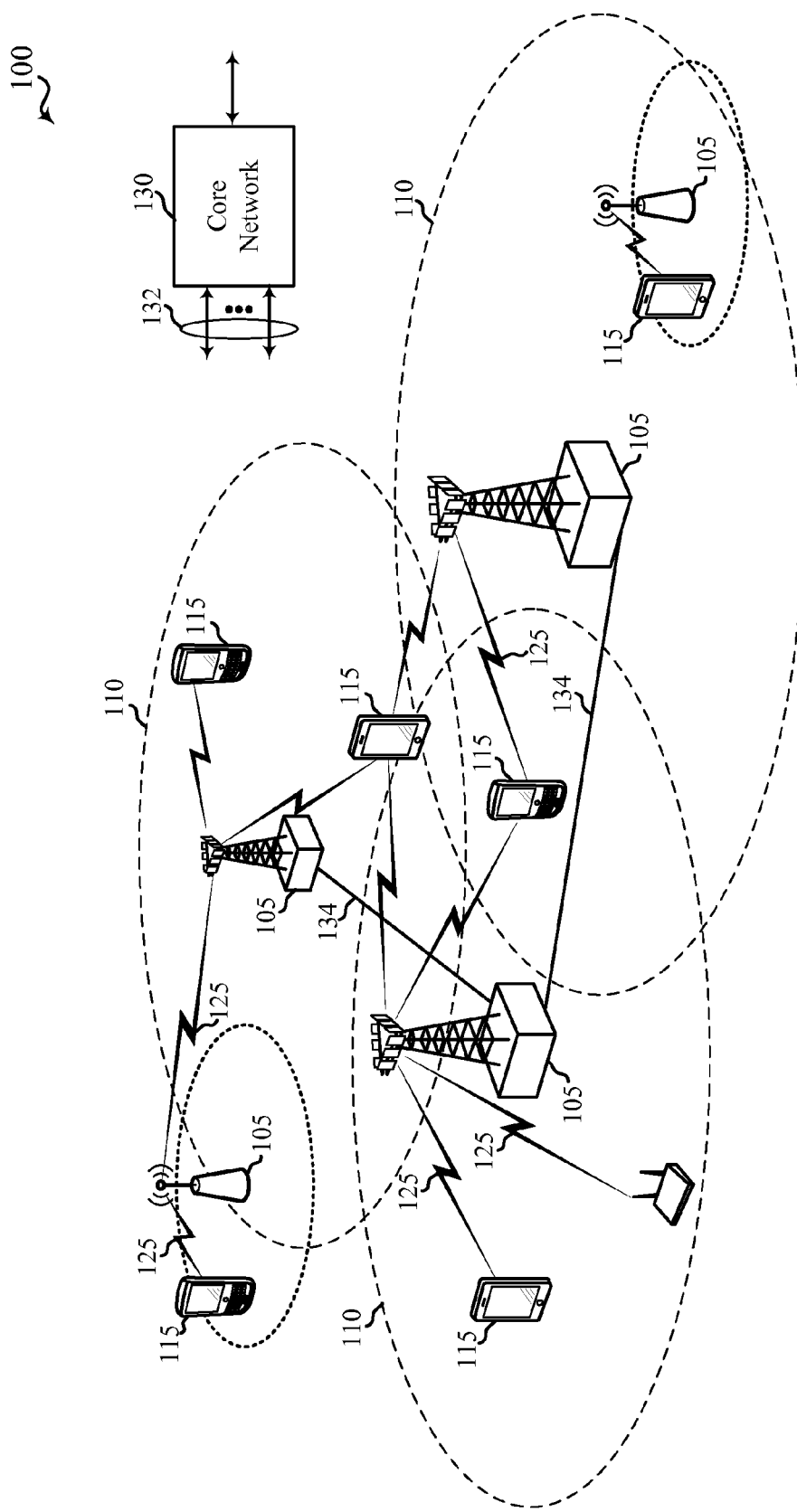
FIG. 1 shows a block diagram of a wireless communication system, in accordance with various aspects of the present disclosure.

Techniques are described for prioritizing the reporting of uplink control information for cells utilizing contention based radio frequency spectrum. The prioritizing may be useful in resolving a conflict for a resource in an uplink subframe (e.g., a resource for reporting uplink control information). In some examples, the techniques may give priority to the reporting of uplink control information for a cell that utilizes contention based radio frequency spectrum (e.g., radio frequency spectrum for which apparatuses contend for access because the radio frequency spectrum is open to unlicensed use) over the reporting of uplink control information for a cell that utilizes contention-free based radio frequency spectrum (e.g., radio frequency spectrum for which apparatuses do not contend for access because the radio frequency spectrum is licensed to particular users for particular uses). In other examples, the techniques may give priority to the reporting of uplink control information for a cell that utilizes contention based radio frequency spectrum when the cell successfully contends for access to the contention based spectrum for a period of time during which measurements are obtained to generate uplink control information for the cell. The disclosed techniques recognize that, because of the dynamic nature of contending for access to contention based radio frequency spectrum, uplink control information for a cell that utilizes contention based radio frequency spectrum may be more valuable than uplink control information for a cell that utilizes contention-free based radio frequency spectrum—especially when there is a long succession of failed Listen Before Talk (LBT) procedures (i.e., failed attempts to contend for access to the contention based radio frequency spectrum). Thus, it may be useful to prioritize the reporting of uplink control information, for a shared resource of an uplink subframe, based on whether a cell utilizes contention based radio frequency spectrum.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or example set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

FIG. 1 shows a block diagram of a wireless communication system 100, in accordance with various aspects of the present disclosure. The wireless communication system 100 includes a plurality of base stations 105 (e.g., eNBs, WLAN access points, or other access points), a number of user equipments (UEs) 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for a base station 105 may be divided into sectors making up only a portion of the coverage area (not shown). The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In some examples, the wireless communication system 100 may include an LTE/LTE-A communication system (or network), which LTE/LTE-A communication system may support one or more modes of operation or deployment in a contention-free based radio frequency spectrum (e.g., radio frequency spectrum for which apparatuses do not contend for access because the spectrum is licensed to particular users for particular uses) and/or a contention based radio frequency spectrum (e.g., radio frequency spectrum for which apparatuses contend for access because the spectrum is open to unlicensed use). In other examples, the wireless communication system 100 may support wireless communication using one or more access technologies different from LTE/LTE-A. In LTE/LTE-A communication systems, the term evolved NodeB or eNB may be, for example, used to describe the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communication system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different types of access networks, such as cellular or other WWAN access networks, or WLAN access networks. In some modes of communication with a UE 115, communication may be conducted over a plurality of communication links 125 or channels (i.e., component carriers), with each channel or component carrier being established between the UE and one of a number of cells (e.g., serving cells, which in some cases may be different base stations 105). Each component carrier may be established over contention-free based radio frequency spectrum or contention based radio frequency spectrum, and a set of component carriers involved in a particular mode of communication may all be received (e.g., at a UE 115) over contention-free based radio frequency spectrum, all be received (e.g., at a UE 115) over contention based radio frequency spectrum, or be received (e.g., at a UE 115) over a combination of contention-free based radio frequency spectrum and contention based radio frequency spectrum.

The communication links 125 shown in wireless communication system 100 may include uplink channels (or component carriers) for carrying uplink (UL) communications (e.g., transmissions from a UE 115 to a base station 105) and/or downlink channels (or component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions. The downlink communications and/or uplink communications may be made using contention-free based radio frequency spectrum, contention based radio frequency spectrum, or both.

In some examples of the wireless communication system 100, LTE/LTE-A may be deployed under different scenarios using contention based radio frequency spectrum. The deployment scenarios may include a supplemental downlink mode in which LTE/LTE-A downlink communications in a contention-free based radio frequency spectrum (e.g., a licensed radio frequency spectrum) may be offloaded to a contention based radio frequency spectrum (e.g., an unlicensed radio frequency spectrum), a carrier aggregation mode in which both LTE/LTE-A downlink and uplink communications may be offloaded from a contention-free based radio frequency spectrum to a contention based radio frequency spectrum, and a standalone mode in which LTE/LTE-A downlink and uplink communications between a base station (e.g., eNB) and a UE may take place in a contention based radio frequency spectrum. Base stations 105 as well as UEs 115 may support one or more of these or similar modes of operation. OFDMA waveforms may be used in the communication links 125 for LTE/LTE-A downlink communications in contention-free based radio frequency spectrum and/or contention based radio frequency spectrum, while OFDMA, SC-FDMA and/or resource block interleaved FDMA waveforms may be used in the communication links 125 for LTE/LTE-A uplink communications in a contention-free based radio frequency spectrum and/or contention based radio frequency spectrum.

Figure 2:
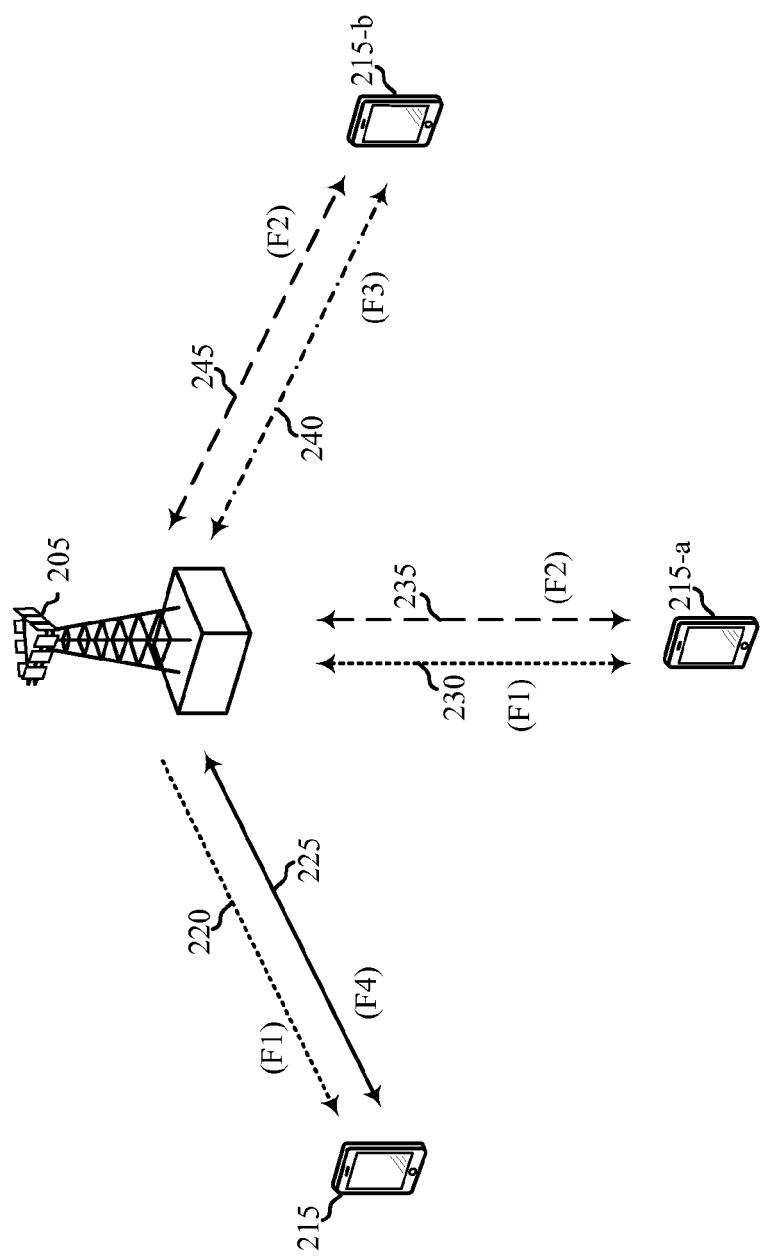
FIG. 2 shows a wireless communication system in which LTE/LTE-A is deployed under different scenarios using contention based radio frequency spectrum, in accordance with various aspects of the present disclosure.

FIG. 2 shows a wireless communication system 200 in which LTE/LTE-A is deployed under different scenarios using contention based radio frequency spectrum, in accordance with various aspects of the present disclosure. More specifically, FIG. 2 illustrates examples of a supplemental downlink mode and a carrier aggregation mode in which LTE/LTE-A is deployed using contention based radio frequency spectrum. The wireless communication system 200 may be an example of portions of the wireless communication system 100 described with reference to FIG. 1. Moreover, the base station 205 may be an example of aspects of one or more of the base stations 105 described with reference to FIG. 1, while a first UE 215, a second UE 215-a, and a third UE 215-b may be examples of aspects of one or more of the UEs 115 described with reference to FIG. 1.

In the example of a supplemental downlink mode in the wireless communication system 200, the base station 205 may transmit OFDMA waveforms to the first UE 215 using a downlink channel 220. The downlink channel 220 may be associated with a frequency F1 in a contention based radio frequency spectrum. The base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a contention-free based radio frequency spectrum. The downlink channel 220 in the contention based radio frequency spectrum and the first bidirectional link 225 in the contention-free based radio frequency spectrum may operate concurrently. The downlink channel 220 may provide a downlink capacity offload for the base station 205. In some examples, the downlink channel 220 may be used for unicast services (e.g., addressed to one UE) or for multicast services (e.g., addressed to several UEs). This scenario may occur with any service provider (e.g., a traditional mobile network operator (MNO)) that uses a contention-free based radio frequency spectrum and needs to relieve some of the traffic and/or signaling congestion.

In one example of a carrier aggregation mode in the wireless communication system 200, the base station 205 may transmit OFDMA waveforms to the second UE 215-a using a second bidirectional link 230 and may receive OFDMA waveforms, SC-FDMA waveforms, and/or resource block interleaved FDMA waveforms from the second UE 215-a using the second bidirectional link 230. The second bidirectional link 230 may be associated with the frequency F1 in contention based radio frequency spectrum. The base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in contention-free based radio frequency spectrum. The second bidirectional link 230 may provide a downlink and uplink capacity offload for the base station 205. Like the supplemental downlink described above, this scenario may occur with any service provider (e.g., MNO) that uses a contention-free based radio frequency spectrum and needs to relieve some of the traffic and/or signaling congestion.

In another example of a carrier aggregation mode in the wireless communication system 200, the base station 205 may transmit OFDMA waveforms to the third UE 215-b using a fourth bidirectional link 240 and may receive OFDMA waveforms, SC-FDMA waveforms, and/or resource block interleaved waveforms from the third UE 215-b using the fourth bidirectional link 240. The fourth bidirectional link 240 may be associated with a frequency F3 in contention based radio frequency spectrum. The base station 205 may also transmit OFDMA waveforms to the third UE 215-b using a fifth bidirectional link 245 and may receive SC-FDMA waveforms from the third UE 215-*b* using the fifth bidirectional link 245. The fifth bidirectional link 245 may be associated with the frequency F2 in contention-free based radio frequency spectrum. The fourth bidirectional link 240 may provide a downlink and uplink capacity offload for the base station 205. This example and those provided above are presented for illustrative purposes and there may be other similar modes of operation or deployment scenarios that combine LTE/LTE-A in contention-free based radio frequency spectrum and contention based radio frequency spectrum for capacity offload.

As described above, one type of service provider that may benefit from the capacity offload offered by using LTE/LTE-A in contention based radio frequency spectrum is a traditional MNO having access rights to LTE/LTE-A contention-free based radio frequency spectrum. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the contention based radio frequency spectrum.

In the carrier aggregation mode, data and control may, for example, be communicated in the contention-free based radio frequency spectrum (e.g., via first bidirectional link 225, third bidirectional link 235, and fifth bidirectional link 245) while data may, for example, be communicated in the contention based radio frequency spectrum (e.g., via second bidirectional link 230 and fourth bidirectional link 240). The carrier aggregation mechanisms supported when using contention based radio frequency spectrum may fall under a hybrid frequency division duplexing-time division duplexing (FDD-TDD) carrier aggregation or a TDD-TDD carrier aggregation with different symmetry across component carriers.

Figure 3:
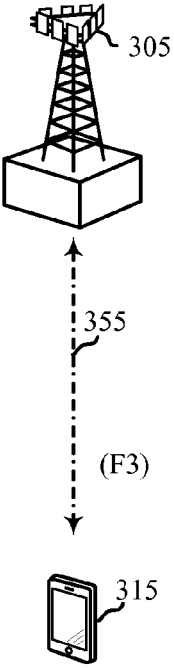
FIG. 3 shows a wireless communication system in which LTE/LTE-A is deployed in a standalone mode using contention based radio frequency spectrum, in accordance with various aspects of the present disclosure.

FIG. 3 shows a wireless communication system 300 in which LTE/LTE-A is deployed in a standalone mode using contention based radio frequency spectrum, in accordance with various aspects of the present disclosure. The wireless communication system 300 may be an example of portions of the wireless communication system 100 and/or 200 described with reference to FIG. 1 and/or 2. Moreover, the base station 305 may be an example of aspects of one or more of the base stations 105 and/or 205 described with reference to FIG. 1 and/or 2, while the UE 315 may be an example of aspects of one or more of the UEs 115 and/or 215 described with reference to FIG. 1 and/or 2.

In the example of a standalone mode in the wireless communication system 300, the base station 305 may transmit OFDMA waveforms to the UE 315 using a bidirectional link 355 and may receive OFDMA waveforms, SC-FDMA waveforms, and/or resource block interleaved FDMA waveforms from the UE 315 using the bidirectional link 355. The bidirectional link 355 may be associated with the frequency F3 in the contention based radio frequency spectrum described with reference to FIG. 2. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a contention-free based radio frequency spectrum.

In some examples, a transmitting device such as a base station 105, 205, and/or 305 (e.g., an eNB) described with reference to FIG. 1, 2, and/or 3, or a UE 115, 215, and/or 315 described with reference to FIG. 1, 2, and/or 3, may use a gating interval to gain access to a channel of the contention based radio frequency spectrum. The gating interval may define the application of a contention-based protocol, such as a Listen Before Talk (LBT) protocol based on the LBT protocol specified in ETSI (EN 301 893). When using a gating interval that defines the application of an LBT protocol, the gating interval may indicate when a transmitting apparatus needs to perform an LBT procedure. The outcome of the LBT procedure may indicate to the transmitting apparatus whether a channel of the contention based radio frequency spectrum is available or in use. When the LBT procedure indicates that the channel is available (e.g., "clear" for use), the gating interval may allow the transmitting apparatus to use the channel—for example, for a predefined transmission interval. When the LBT procedure indicates that the channel is not available (e.g., in use or reserved), the gating interval may prevent the transmitting apparatus from using the channel during the transmission interval.

In some examples, it may be useful for a transmitting apparatus to generate a gating interval on a periodic basis and synchronize at least one boundary of the gating interval with at least one boundary of a periodic frame structure. For example, it may be useful to generate a periodic gating interval for a cellular downlink in a contention-free based radio frequency spectrum, and to synchronize at least one boundary of the periodic gating interval with at least one boundary of a periodic frame structure (e.g., an LTE/LTE-A radio frame) associated with the cellular downlink.

Figure 4:
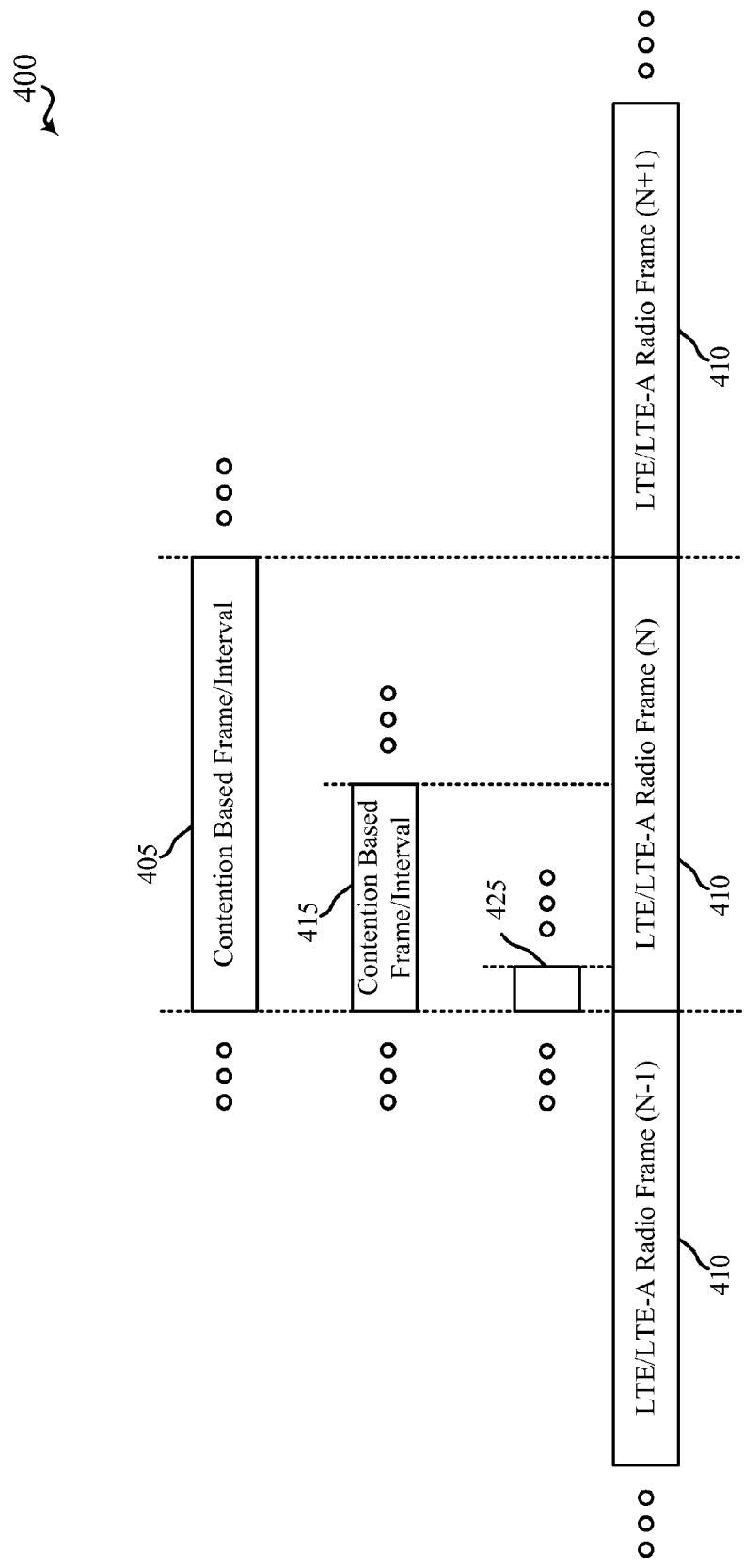
FIG. 4 shows examples of a frame/interval for a cellular downlink or uplink using contention based radio frequency spectrum, in accordance with various aspects of the present disclosure.

FIG. 4 shows examples 400 of a frame/interval for a cellular downlink or uplink using contention based radio frequency spectrum, in accordance with various aspects of the present disclosure. A first contention based frame/interval 405, a second contention based frame/interval 415, and/or a third contention based frame/interval 425 may be used as a periodic gating interval by an eNB that supports transmissions over contention based radio frequency spectrum. Examples of such an eNB may include the base stations 105, 205, and/or 305 described with reference to FIG. 1, 2, and/or 3. The first contention based frame/interval 405, the second contention based frame/interval 415, and/or the third contention based frame/interval 425 may be used with the wireless communication system 100, 200, and/or 300 described with reference to FIG. 1, 2, and/or 3.

By way of example, the duration of the first contention based frame/interval 405 is shown to be equal to (or approximately equal to) a duration of an LTE/LTE-A radio frame 410 of a periodic frame structure associated with a cellular downlink. In some examples, "approximately equal" means the duration of the first contention based frame/interval 405 is within a cyclic prefix (CP) duration of the duration of the periodic frame structure.

At least one boundary of the first contention based frame/interval 405 may be synchronized with at least one boundary of the periodic frame structure that includes the LTE/LTE-A radio frames N−1 to N+1. In some cases, the first contention based frame/interval 405 may have boundaries that are aligned with the frame boundaries of the periodic frame structure. In other cases, the first contention based frame/interval 405 may have boundaries that are synchronized with, but offset from, the frame boundaries of the periodic frame structure. For example, the boundaries of the first contention based frame/interval 405 may be aligned with subframe boundaries of the periodic frame structure, or with subframe midpoint boundaries (e.g., the midpoints of particular subframes) of the periodic frame structure.

In some cases, the periodic frame structure may include LTE/LTE-A radio frames N−1 to N+1. Each LTE/LTE-A radio frame 410 may have a duration of ten milliseconds, for example, and the first contention based frame/interval 405 may also have a duration of ten milliseconds. In these cases, the boundaries of the first contention based frame/interval 405 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the duration of the second contention based frame/interval 415 and the third contention based frame/interval 425 are shown to be sub-multiples of (or approximate sub-multiples of) the duration of the periodic frame structure associated with the cellular downlink. In some examples, an "approximate sub-multiple of" means the duration of the second contention based frame/interval 415 or the third contention based frame/interval 425 is within a cyclic prefix (CP) duration of the duration of a sub-multiple of (e.g., half or one-tenth) the periodic frame structure. For example, the second contention based frame/interval 415 may have a duration of five milliseconds and the third contention based frame/interval 425 may have a duration of 1 or 2 milliseconds.

Figure 5A:
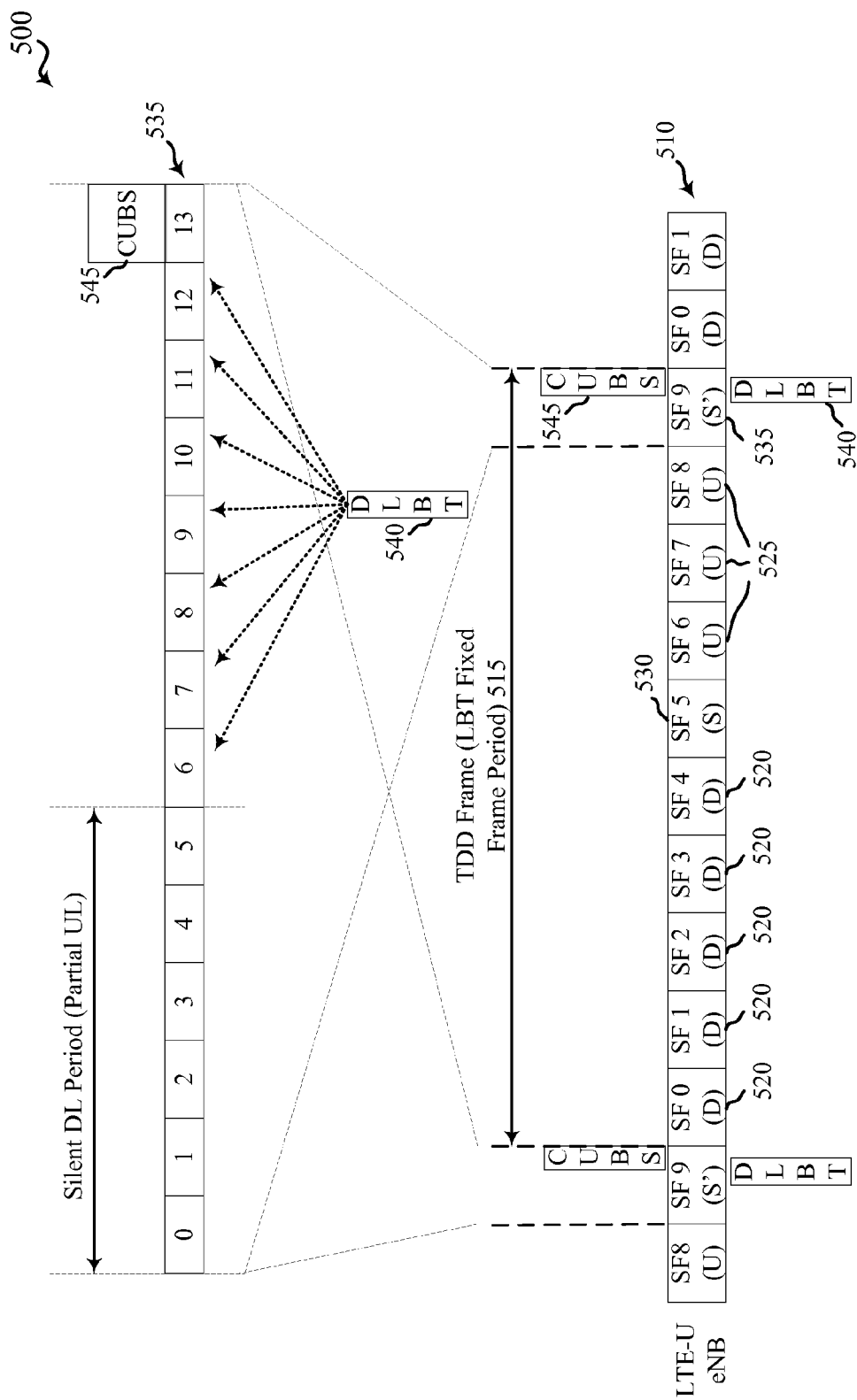
FIG. 5A shows an example of a wireless communication over contention based radio frequency spectrum, in accordance with various aspects of the present disclosure.

FIG. 5A shows an example 500 of a wireless communication 510 over contention based radio frequency spectrum, in accordance with various aspects of the present disclosure. A TDD frame 515, which may correspond to an LBT fixed frame period, may have a duration of 10 milliseconds and include a number of downlink subframes 520, a number of uplink subframes 525, and two types of special subframes, an S subframe 530 and an S' subframe 535. The S subframe 530 may provide a transition between downlink subframes 520 and uplink subframes 525, while the S' subframe 535 may provide a transition between uplink subframes 525 and downlink subframes 520. During the S' subframe 535, a downlink LBT procedure (D-LBT) 540 may be performed by one or more base stations, such as one or more of the base stations 105 and/or 205 described with reference to FIG. 1, 2, and/or 3, to reserve, for a period of time, the channel over which the wireless communication 510 occurs. Following a successful D-LBT 540 by a base station, the base station may transmit a channel usage beacon signal (CUBS) 545 to provide an indication to other base stations and/or apparatuses that the base station has reserved the channel.

The S' subframe 535 may include 14 OFDM symbols, numbered 0 through 13 in FIG. 5A. A first portion of the S' subframe 535, symbols 0 through 5 in this example, may be used by base stations as a silent DL period, which may be required for compatibility with LTE/LTE-A communication standards. Thus, a base station may not transmit data during the silent DL period, although a UE may transmit some amount of uplink data during the silent DL period. A second portion of the S' subframe 535 may be used for D-LBT 540. In the example 500, the S' subframe 535 includes seven D-LBT slots, included in symbols 6 through 12. Use of the D-LBT slots by different network operators may be coordinated to provide more efficient system operation. In some examples, in order to determine which of the seven possible D-LBT slots to use to perform a D-LBT procedure, a base station 105 may evaluate a mapping-function of the form:

$$F_D(\text{GroupID}, t) \in \{1,2,3,4,5,6,7\}$$

where GroupID is a "deployment group-id" assigned to the base station 105, and t is the LBT frame number corresponding to a frame for which D-LBT is performed.

Figure 5B:
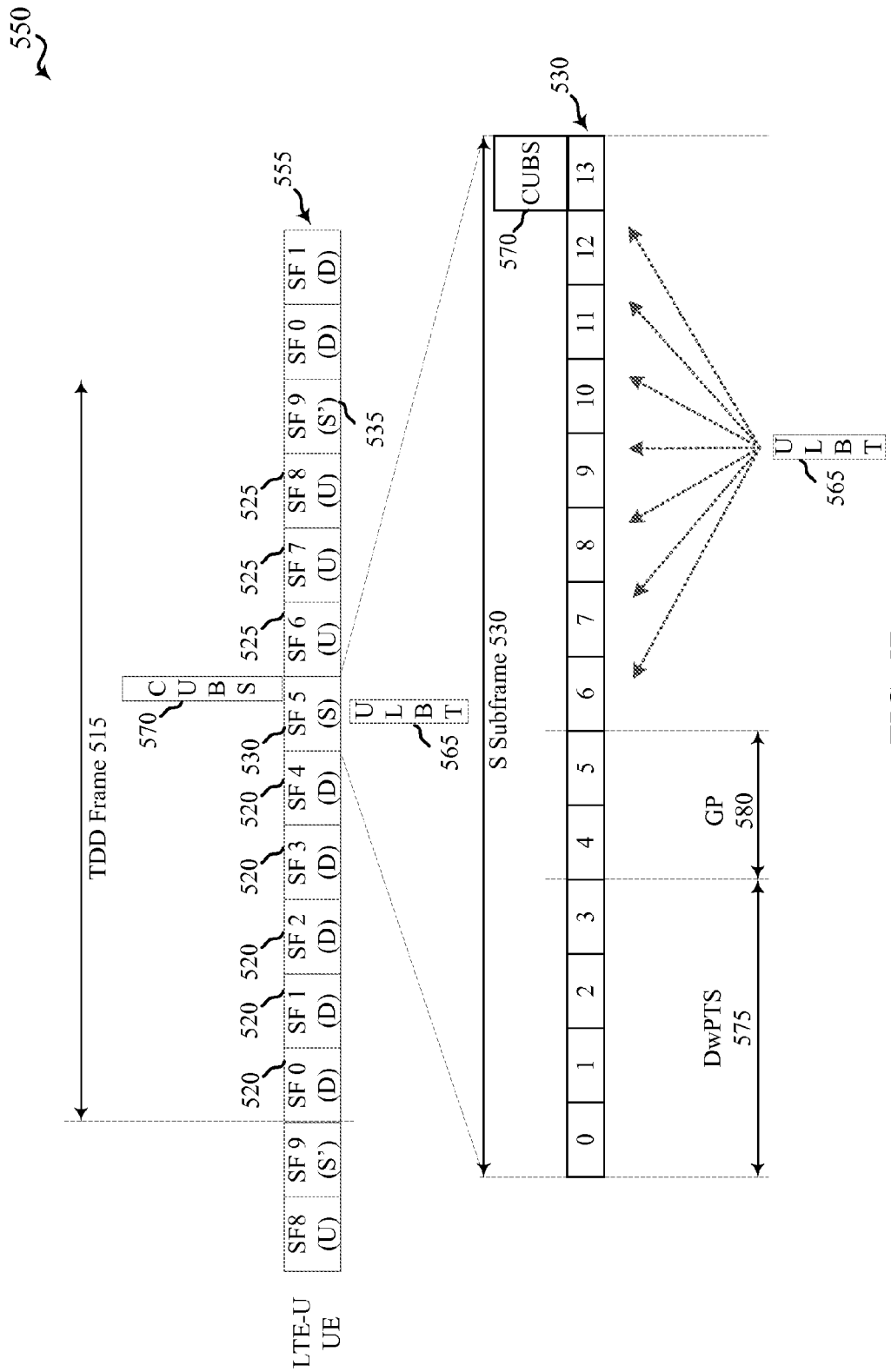
FIG. 5B shows an example of a wireless communication over contention based radio frequency spectrum, in accordance with various aspects of the present disclosure.

FIG. 5B shows an example 550 of a wireless communication 555 over contention based radio frequency spectrum, in accordance with various aspects of the present disclosure. A TDD frame 515, which may correspond to the LBT frame period of FIG. 5A, and may correspond to an LBT fixed frame period, may include a number of downlink subframes 520, a number of uplink subframes 525, and two types of special subframes, an S subframe 530 and an S' subframe 535. As discussed above, the S subframe 530 may provide a transition between downlink subframes 520 and uplink subframes 525, while the S' subframe 535 may provide a transition between uplink subframes 525 and downlink subframes 520. During the S subframe 530, an uplink LBT procedure (U-LBT) 565 may be performed by one or more UEs, such as one or more of the UEs 115, 215, and 315 described above with reference to FIG. 1, 2, and/or 3, to reserve, for a period of time, the channel over which the wireless communication 555 occurs. Following a successful U-LBT 565 by a UE, the UE may transmit a channel usage beacon signal (CUBS) 570 to provide an indication to other UEs and/or apparatuses that the UE has reserved the channel.

The S subframe 530 may include 14 OFDM symbols, numbered 0 through 13 in FIG. 5B. A first portion of the S subframe 530, symbols 0 through 3 in this example, may be used as a downlink pilot time slot (DwPTS) 575, and a second portion of the S subframe 530 may be used as a guard period (GP) 580. A third portion of the S subframe 530 may be used for U-LBT 565. In the example 550, the S subframe 530 includes seven U-LBT slots, included in symbols 6 through 12. Use of the U-LBT slots by different UEs may be coordinated to provide more efficient system operation. In some examples, in order to determine which of the seven possible U-LBT slots to use to perform a U-LBT procedure, a UE may evaluate a mapping-function of the form:

$$F_U(\text{GroupID}, t) \in \{1,2,3,4,5,6,7\}$$

where GroupID is a "deployment group-id" assigned to the UE, and t is the LBT frame number corresponding to a frame for which U-LBT is performed.

The mapping function for D-LBT and/or U-LBT may be constructed based on different criteria, depending on whether the mapping function will have an orthogonalization or a non-orthogonalization property. In examples with orthogonal LBT access, the mapping function may have an orthogonalization property according to:

$$F_{D/U}(x, t) \neq F_{D/U}(y, t)$$

$$\text{GroupID } x, y \in \{1,2,3,4,5,6,7\}$$

for all time t, whenever x≠y represent different group-ids. In this case, base stations and/or UEs with different group-ids may perform LBT procedures during non-overlapping LBT time intervals. In the absence of interference, the base station or UE with the group-id which maps to an earlier LBT time slot may secure the channel for a period of time. According to various deployments, the mapping-function is fair, in the sense that across different time indices t, the mapping $\{F_{D/U}(x, t), t=1, 2, 3, \ldots\}$ varies such that different group-ids have an equal chance of mapping to an earlier LBT time slot (and hence secure the channel in the absence of other interference) over a suitably long interval of time.

All base stations and UEs deployed by the same network operator/service-provider may be assigned the same group-id, so that they do not preempt each other in the contention process. This allows full frequency reuse among base stations and UEs of the same deployment, leading to enhanced system throughput. Base stations and/or UEs of different deployments may be assigned different group-ids, so that with orthogonal LBT slot mapping, access to the channel is mutually exclusive.

In examples with non-orthogonal, or overlapping, LBT slot access, the mapping function may allow more than seven group ids. In some situations, for example, it may be useful to support more than seven deployment group-ids, in which case it is not possible to maintain the orthogonality property of LBT slot mapping functions. In such cases, it may be desirable to reduce the frequency of collision between any two group-ids. In some examples, non-orthogonal LBT slot mapping sequences may also be used to provide fair channel sharing among deployments without tight coordination on LBT opportunities. One example of a non-orthogonal LBT slot mapping sequence is given by:

$$F_{D/U}(x, t) = R_{1,7}(x, t)$$

$$\text{GroupID } x = \epsilon\{1, 2, \ldots 2^{16}\}$$

where $R_{1,7}(x,t)$ is a pseudo-random number generator between 1 and 7 chosen independently for GroupID x. In this case, there could be potential collisions between base stations and/or UEs of different GroupID's in the same LBT frame t.

Thus, LBT time slots may be selected according to the noted mapping functions and used for D-LBT 540 and/or U-LBT 565.

Some modes of communication with a UE may require communication over a plurality of channels (i.e., component carriers), with each channel being established between the UE and one of a number of cells using different component carriers (e.g., serving cells, which in some cases may be different base stations). In some examples, two or more cells may use different carrier frequencies or component carriers, as might be found in a carrier aggregation and/or dual-connectivity (e.g., multiflow) mode of communication. In other examples, two or more cells may be of a same carrier frequency, as might be found in a coordinated multipoint (CoMP) mode of communication. Regardless, each component carrier may be used over contention-free based radio frequency spectrum or contention based radio frequency spectrum, and a set of component carriers involved in a particular mode of communication may all be received over contention-free based radio frequency spectrum, all be received over contention based radio frequency spectrum, or be received over a combination of contention-free based radio frequency spectrum and contention based radio frequency spectrum. To establish communication using a component carrier over contention based radio frequency spectrum, an LBT procedure may be performed to contend for access to the contention based radio frequency spectrum. When the LBT procedure is successful, the component carrier may be used for communication in the contention based radio frequency spectrum. When the LBT procedure fails, the component carrier may not be used.

Figure 6:
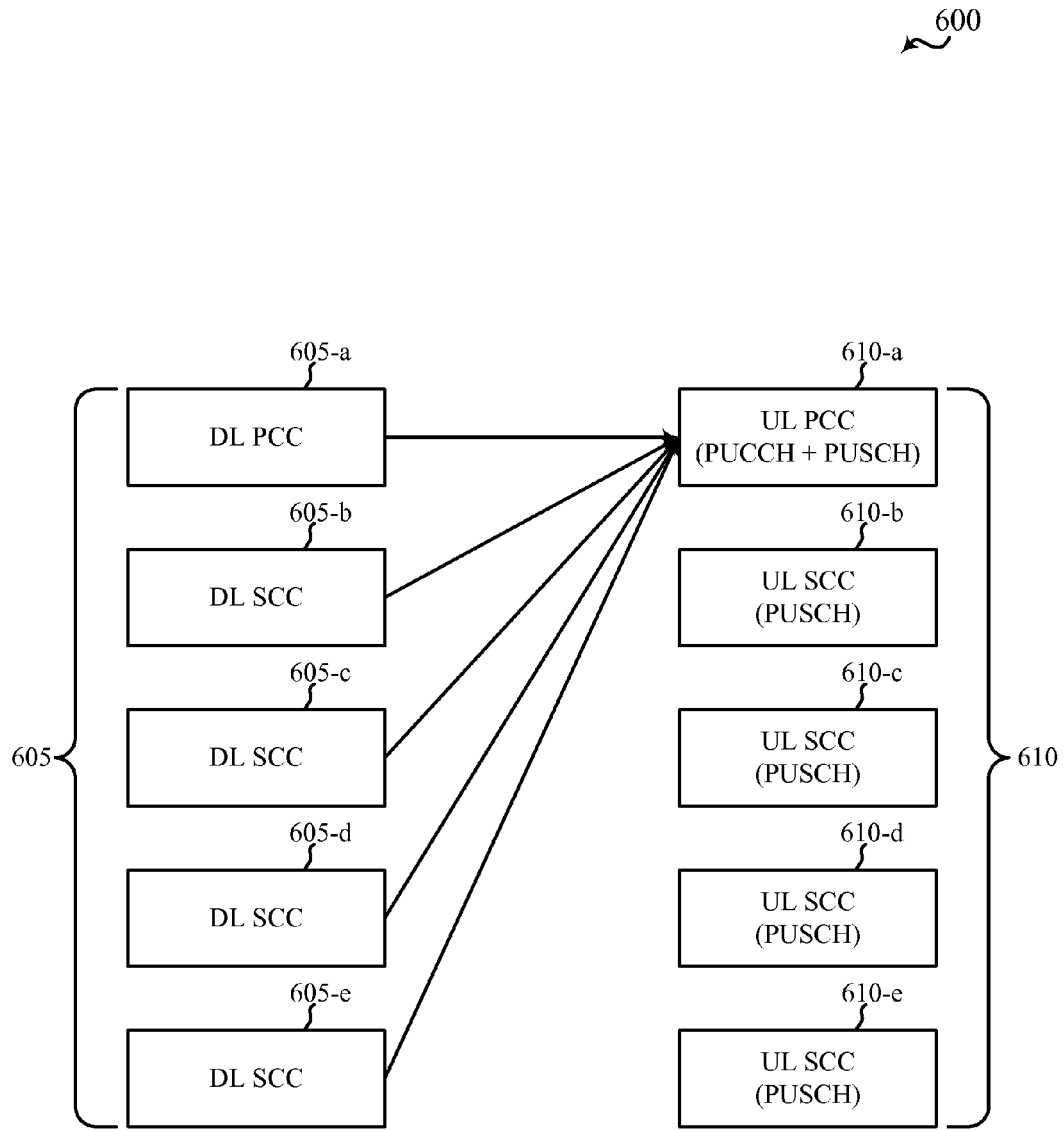
FIG. 6 shows example sets of downlink component carriers and uplink component carriers, in accordance with various aspects of the present disclosure.

FIG. 6 shows example sets 600 of downlink component carriers 605 and uplink component carriers 610, in accordance with various aspects of the present disclosure. More particularly, and by way of example, FIG. 6 shows five downlink (DL) component carriers (CCs) 605 and five uplink (UL) CCs 610. The DL CCs 605 include a DL primary component carrier (DL PCC) 605-*a*, a first DL secondary component carrier (DL SCC) 605-*b*, a second DL SCC 605-*c*, a third DL SCC 605-*d*, and a fourth DL SCC 605-*e*. Similarly, the UL CCs 610 include a UL PCC 610-*a*, a first UL SCC 610-*b*, a second UL SCC 610-*c*, a third UL SCC 610-*d*, and a fourth UL SCC 610-*e*. The UL PCC 610-*a* may, for a network such as an LTE/LTE-A network, carry a Physical Uplink Control Channel (PUCCH); and each of the UL PCC 610-*a*, the first UL SCC 610-*b*, the second UL SCC 610-*c*, the third UL SCC 610-*d*, and the fourth UL SCC 610-*e* may carry a Physical Uplink Shared Channel (PUSCH). Uplink control information such as acknowledgements and non-acknowledgements (ACKs/NAKs), channel state information (CSI), and/or scheduling request (SR) control information may, in some examples, be transmitted on the PUCCH.

In some examples, each of the DL PCC 605-*a*, the first DL SCC 605-*b*, the second DL SCC 605-*c*, the third DL SCC 605-*d*, and the fourth DL SCC 605-*e* may be mapped to the UL PCC 610-*a* for purposes of reporting uplink control information for a first cell corresponding to the DL PCC 605-*a*, a second cell corresponding to the first DL SCC 605-*b*, a third cell corresponding to the second DL SCC 605-*c*, a fourth cell corresponding to the third DL SCC 605-*d*, and a fifth cell corresponding the fourth DL SCC 605-*e*. To reduce the overhead of the PUCCH carried on the UL PCC 610-*a*, the PUCCH may be configured such that a resource (e.g., a shared resource, such as one or more OFDM symbols) in an uplink subframe of the UL PCC 610-*a* is used to report uplink control information for each of the first cell, the second cell, the third cell, the fourth cell, and the fifth cell. A conflict for the resource in the uplink subframe may therefore exist. To resolve the conflict, reporting of the uplink control information for each of the first cell, the second cell, the third cell, the fourth cell, and the fifth cell may be prioritized such that uplink control information for one of the first cell, the second cell, the third cell, the fourth cell, and the fifth cell is transmitted during a particular instance of the resource.

Periodic uplink control information reporting and/or aperiodic uplink control information reporting may be supported in a system in which data and control information is transmitted from a plurality of cells (e.g., using different component carriers) to a UE over a set of DL CCs such as the DL CCs 605, and transmitted from the UE to one or more of the base stations corresponding to the plurality of cells over a set of UL CCs such as the UL CCs 610. In an example of periodic uplink control information reporting in a carrier aggregation mode, the reporting of uplink control information may be prioritized based on priority levels of reporting types of CSI.

In some examples, the priority levels of the reporting types of CSI may include: a top priority level when a reporting type of CSI includes at least one of a rank indicator (RI), a precoding type indicator (PTI), or a wideband precoding matrix indicator (PMI) (e.g., a reporting type of 3, 5, 6, or 2a); a medium priority level when a reporting type of CSI includes at least one of a wideband channel quality indication (CQI), or a wideband CQI with PMI (e.g., a reporting type of 2, 2b, 2c, or 4); and/or a low priority level when a reporting type of CSI includes at least one of a subband CQI, or a subband CQI with PMI (e.g., a reporting type of 1, 1a). When priority level of the reporting type of CSI is the same for two or more cells, priority for reporting uplink control information may be determined based on a comparison of serving cell indices of the conflicting cells. For example, a cell with a lower cell index may be given a priority over a cell with a higher cell index. The serving cell indices for a plurality of cells may be configured on a UE-by-UE basis. The same priority rules may be applies regardless of whether PUSCH is transmitted.

After prioritizing the reporting of uplink control information for a plurality of cells, the uplink control information for the cell associated with the highest priority may be reported using the resource for which a conflict exists, and the uplink control information for the remaining cells may be discarded.

In an example of aperiodic uplink control information reporting in a carrier aggregation mode, the reporting of uplink control information may be prioritized based on the state of a two bit CSI request field, in which a "00" state may indicate that no CSI should be reported; a "01" state may indicate that uplink control information for the cell/DL CC 605 that is system information block 2 (SIB2)-linked to the UL PCC 610-*a*; and "10" and "11" states may indicate that the prioritization of the reporting of uplink control information for a plurality of cells is configured by radio resource control (RRC). For the common search space, a "0" state may indicate that no CSI should be reported; and a "1" state may indicate that the prioritization of the reporting of uplink control information for a plurality of cells is configured by RRC. The RRC may prioritize reporting for any combination of up to five component carriers.

Consider now a set of DL CCs such as the DL CCs 605 shown in FIG. 6, in which a first DL CC such as the DL PCC 605-*a* is transmitted over contention-free based radio frequency spectrum (e.g., radio frequency spectrum licensed for use by LTE/LTE-A base stations and UEs) and in which a second DL CC such as the DL SCC 605-*b* is transmitted over contention based radio frequency spectrum (e.g., radio frequency spectrum for which LTE/LTE-A base stations and UEs need to contend for access). Because a DL PCC is in some examples assigned a serving cell index of "0" (i.e., the lowest serving cell index), any time there is a conflict for resources based on priority level of reporting type of CSI, the cell associated with the DL PCC 605-*a* will be given priority. This, combined with the fact that use of contention based radio frequency spectrum is dependent on contending for access to the contention based radio frequency spectrum via a successful LBT procedure (and therefore opportunistic), means that the reporting of uplink control information for the cell associated with the DL SCC 605-*b* may be infrequent or, in some cases, effectively blocked. However, because of the dynamic nature of contending for access to contention based radio frequency spectrum, uplink control information for a cell that uses a CC over contention based radio frequency spectrum may be more valuable—especially when there is a long succession of failed LBT procedures. Thus, it may be useful to prioritize the reporting of uplink control information, for a shared resource of an uplink subframe, based at least in part on whether a cell utilizes contention based radio frequency spectrum.

Figure 7:
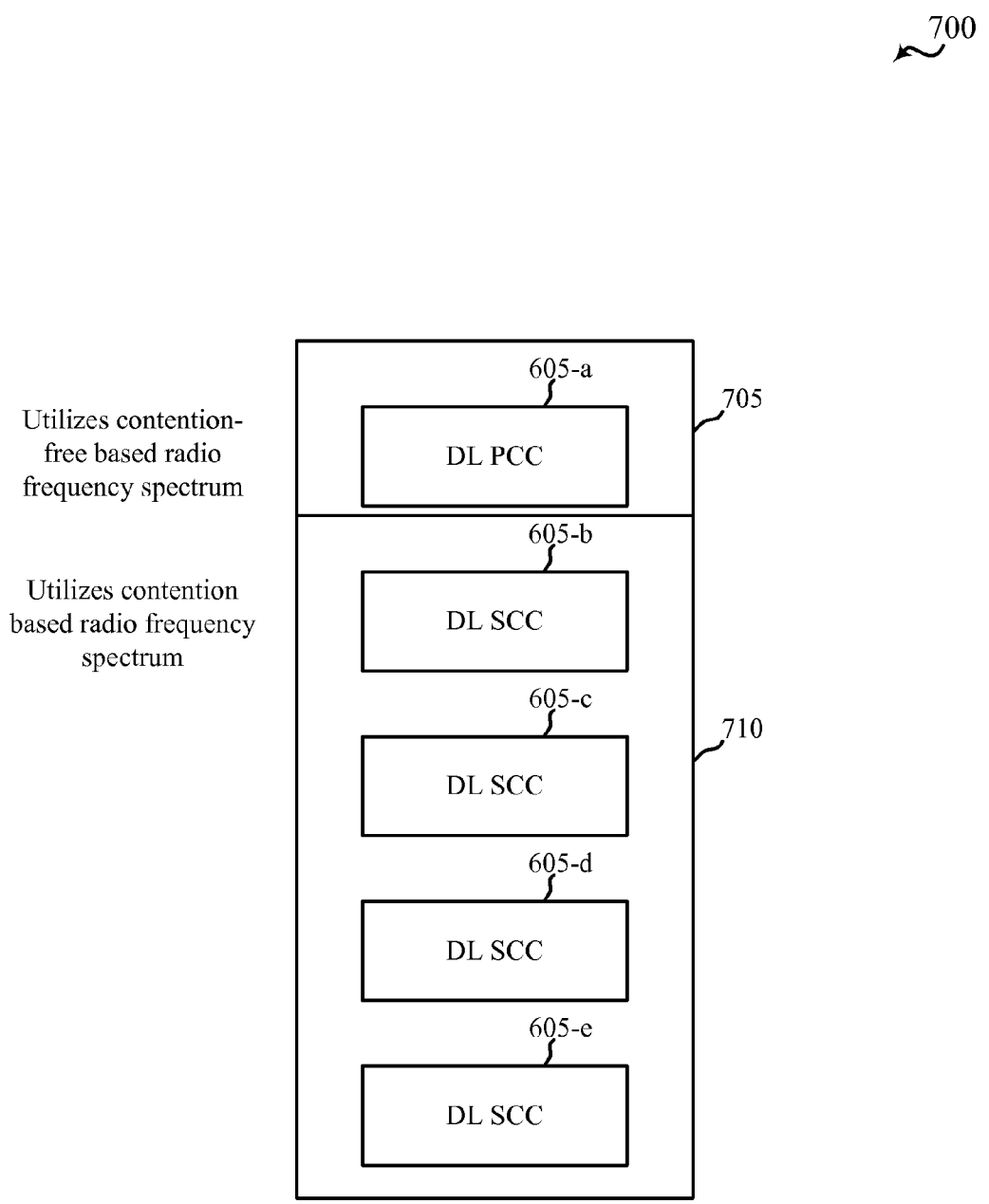
FIG. 7 shows a first example grouping and prioritization of the cells corresponding to the downlink (DL) component carriers (CCs) shown in FIG. 6, in accordance with various aspects of the present disclosure.

FIG. 7 shows a first example grouping and prioritization 700 of the cells corresponding to the downlink (DL) component carriers (CCs) 605 shown in FIG. 6, in accordance with various aspects of the present disclosure. The grouping is based at least in part on whether the cell associated with each DL CC 605 utilizes contention based radio frequency spectrum. By way of example, the cell associated with the DL PCC 605-*a* is indicated to utilize contention-free based radio frequency spectrum, such that the DL PCC 605-*a* is placed in a first group 705, and the cells associated with the first DL SCC 605-*b*, the second DL SCC 605-*c*, the third DL SCC 605-*d*, and the fourth DL SCC 605-*e* are indicated to utilize contention based radio frequency spectrum, such that the first DL SCC 605-*b*, the second DL SCC 605-*c*, the third DL SCC 605-*d*, and the fourth DL SCC 605-*e* are organized in a second group 710. When prioritizing the reporting of uplink control information for the cells corresponding to the DL PCC 605-*a*, the first DL SCC 605-*b*, the second DL SCC 605-*c*, the third DL SCC 605-*d*, and the fourth DL SCC 605-*e*, the cells corresponding to the DL CCs 605 of the second group 710 may be given priority over the cells corresponding to the DL CCs 605 of the first group 705, thereby ensuring that the reporting of uplink control information for a cell that utilizes contention based radio frequency spectrum is given priority over the reporting of uplink control information for a cell that utilizes contention-free based radio frequency spectrum. Within each group (e.g., within the first group 705 and within the second group 710), a cell with a lower serving cell index may be given priority over a cell with a higher serving cell index.

Figure 8:
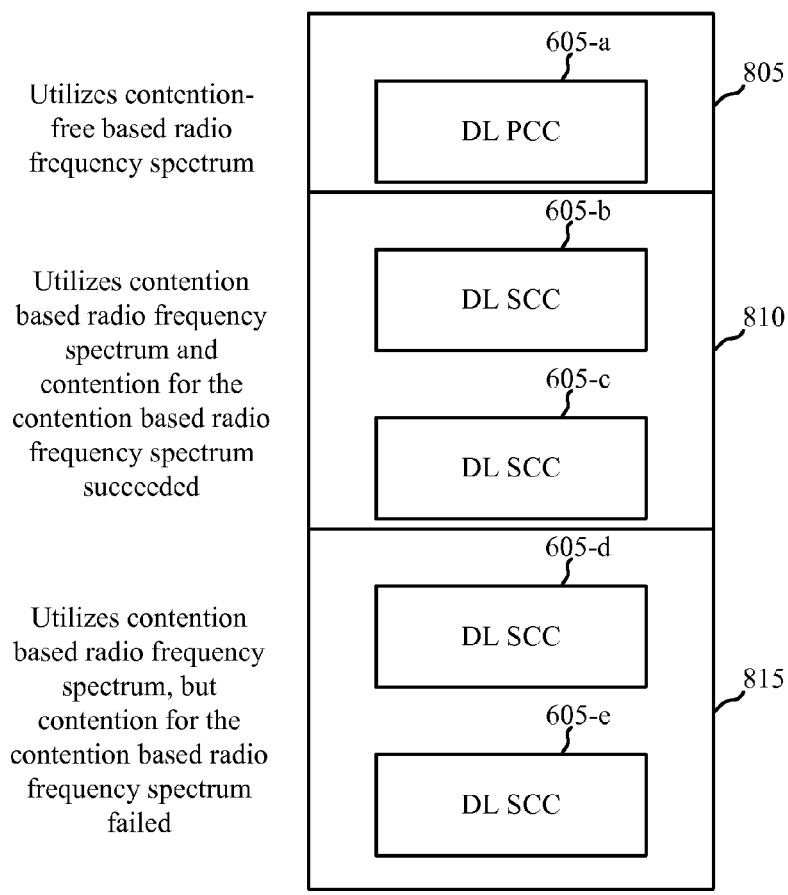
FIG. 8 shows a second example grouping and prioritization of the cells corresponding to the DL CCs shown in FIG. 6, in accordance with various aspects of the present disclosure.

FIG. 8 shows a second example grouping and prioritization 800 of the cells corresponding to the DL CCs 605 shown in FIG. 6, in accordance with various aspects of the present disclosure. The grouping is based, at least in part, on whether the cell associated with each DL CC 605 utilizes contention based radio frequency spectrum. By way of example, the cell associated with the DL PCC 605-*a* is indicated to utilize contention-free based radio frequency spectrum, such that the DL PCC 605-*a* is placed in a first group 805. The cells associated with the first DL SCC 605-*b*, the second DL SCC 605-*c*, the third DL SCC 605-*d*, and the fourth DL SCC 605-*e* are indicated to utilize contention based radio frequency spectrum. However, the cells that utilize contention based radio frequency spectrum may be further divided into a subgroup of cells for which contention to the contention based radio frequency spectrum succeeded (e.g., a subgroup of cells for which a valid measurement subframe containing a reference signal (RS) to be measured may have been transmitted, and for which a valid measurement or measurements may have been obtained for generating uplink control information) and a subgroup of cells for which contention to the contention based radio frequency spectrum failed (e.g., a subgroup of cells for which a valid measurement subframe containing an RS to be measured would not have been transmitted, and for which a valid measurement or measurements would not have been obtained for generating uplink control information). This further division of cells may cause the first DL SCC 605-*b* and the second DL SCC 605-*c* to be organized in a second group 810, based on contention to the contention based radio frequency spectrum having succeeded, and may cause the third DL SCC 605-*d* and the fourth DL SCC 605-*e* to be organized in a third group 815 based on contention to the contention based radio frequency spectrum having failed. When prioritizing the reporting of uplink control information for the cells corresponding to the DL PCC 605-*a*, the first DL SCC 605-*b*, the second DL SCC 605-*c*, the third DL SCC 605-*d*, and the fourth DL SCC 605-*e*, the cells corresponding to the DL CCs 605 of the second group 810 may be given priority over the cells corresponding to the DL CCs 605 of the first group 805, and the cells corresponding to the DL CCs 605 of the first group 805 may be given priority over the cells corresponding to the DL CCs 605 of the third group 815, thereby ensuring that the reporting of uplink control information for a cell that utilizes contention based radio frequency spectrum, and that acquired access to the contention based radio frequency spectrum, is given priority over the reporting of other cells, and ensuring that the reporting of uplink control information for a cell that utilizes contention based radio frequency spectrum, but which did not gain access to the contention based radio frequency spectrum, is given a lower priority than other cells. Alternately, the first group 805, the second group 810, and the third group 815 may be prioritized in other ways, such as, with the second group 810 prioritized above the third group 815, and the third group 815 prioritized above the first group 805. For example, the second group 810 may be prioritized above the third group 815, even though one or more cells of the second group 810 may have a higher cell index than one or more cells of the third group 815, because the cell(s) of the second group 810 successfully contended for access to the contention based radio frequency spectrum while the cell(s) of the third group 815 failed contending for access to the contention based radio frequency spectrum. Within each group, the reporting of uplink control information for different cells may, for example, be prioritized by serving cell index (e.g., with the reporting of uplink control information for a cell having a lower serving cell index being given priority over the reporting of uplink control information for a cell having a higher serving cell index).

As described above, the reporting of the uplink control information for the cells corresponding to the DL CCs 605 of the third group 815 may be given a lower priority (e.g., lower than the priority of the first group 805 and/or the second group 810) because the cells failed to acquire access to the contention based radio frequency spectrum. For example, the cells corresponding to the DL CCs 605 of the third group 815 may report previously stored uplink control information (e.g., because of failure to obtain a valid measurement). Thus, the reporting of the uplink control information for the cells corresponding to the DL CCs 605 of the third group 815 may be assigned a lower priority because the previously stored uplink control information may not accurately reflect the current state of the uplink control information. In another example, the cells corresponding to the DL CCs 605 of the third group 815 may report previously stored uplink control information when the previously stored uplink control information is obtained within a time threshold (e.g., within 5 seconds of the current reporting period). In other examples, the cells corresponding to the DL CCs 605 of the third group 815 may omit reporting uplink control information in order to save network resources when the cells failed to acquire access to the contention based radio frequency spectrum. When the cells corresponding to the DL CCs 605 of the third group 815 omit reporting uplink control information, the cells of the third group 815 may not be considered during the prioritization process.

Figure 9:
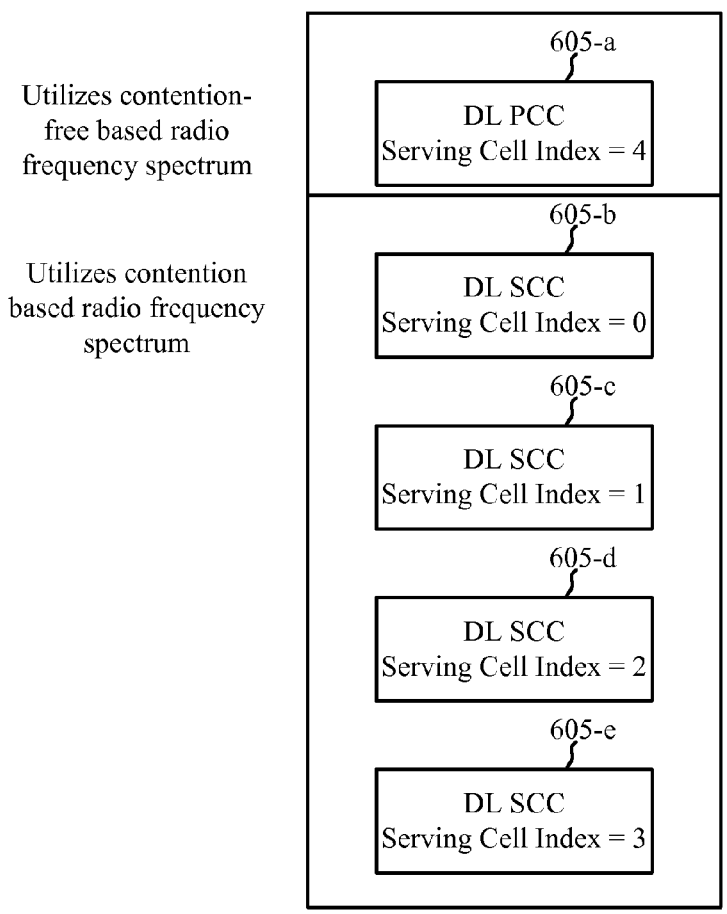
FIG. 9 shows a third example prioritization of the cells corresponding to the DL CCs shown in FIG. 6, in accordance with various aspects of the present disclosure.

FIG. 9 shows a third example prioritization 900 of the cells corresponding to the DL CCs 605 shown in FIG. 6, in accordance with various aspects of the present disclosure. The prioritization is based at least in part on a serving cell index of each cell. The serving cell indices may be assigned by a base station or other apparatus, and may be particular to one or more UEs. The serving cell indices may be assigned in such a manner that priority for the reporting of uplink control information is given to cells that utilizes contention based radio frequency spectrum. Thus, and by way of example, the cells associated with the first DL SCC 605-*b*, the second DL SCC 605-*c*, the third DL SCC 605-*d*, and the fourth DL SCC 605-*e* may be assigned respective serving cell indices of "0" (i.e., highest priority), "1", "2", and "3" based on their utilization of contention based radio frequency spectrum, and the cell associated with the DL PCC 605-*a* may be assigned a serving cell index of "4" (i.e., lowest priority) based on its utilization of contention-free based radio frequency spectrum. Other prioritizations may also be achieved, by virtue of a base station or other apparatus changing the serving cell index assignments of the various cells. In some cases, it may be desirable to prioritize the reporting of uplink control information for a cell that utilizes contention-free based radio frequency spectrum over the reporting of uplink control information for one or more cells that utilize contention based radio frequency spectrum.

Figure 10:
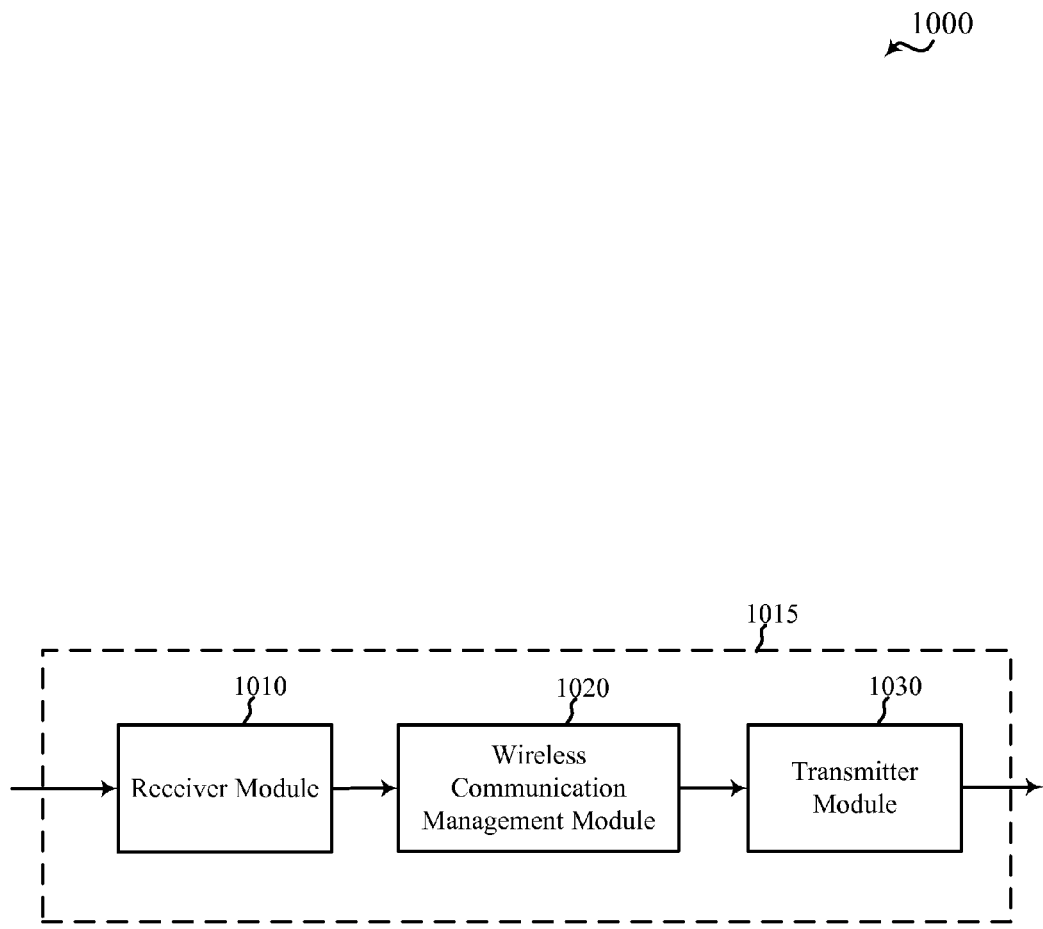
FIG. 10 shows a block diagram of an apparatus for use in wireless communication, in accordance with various aspects of the present disclosure.

FIG. 10 shows a block diagram 1000 of an apparatus 1015 for use in wireless communication, in accordance with various aspects of the present disclosure. In some examples, the apparatus 1015 may be an example of aspects of one or more of the UEs 115, 215, and/or 315 described with reference to FIG. 1, 2, and/or 3. The apparatus 1015 may also be a processor. The apparatus 1015 may include a receiver module 1010, a wireless communication management module 1020, and/or a transmitter module 1030. Each of these components may be in communication with each other.

The components of the apparatus 1015 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1010 may include at least one radio frequency (RF) receiver, such as at least one RF receiver operable to receive transmissions over contention-free based radio frequency spectrum (e.g., radio frequency spectrum for which apparatuses do not contend for access because the radio frequency spectrum is licensed to particular users for particular uses) and/or contention based radio frequency spectrum (e.g., radio frequency spectrum for which apparatuses contend for access because the radio frequency spectrum is open to unlicensed use). In some examples, both the contention-free based radio frequency spectrum and the contention based radio frequency spectrum may be used for LTE/LTE-A communications, as described, for example, with reference to FIG. 2 and/or 3. The receiver module 1010 may be used to receive various types of data and/or control signals (i.e., transmissions) over one or more communication links of a wireless communication system, such as one or more communication links 125 of the wireless communication system 100, 200, and/or 300 described with reference to FIG. 1, 2, and/or 3. The communication links 125 may be established over the contention-free based radio frequency spectrum and/or the contention based radio frequency spectrum.

In some examples, the transmitter module 1030 may include at least one RF transmitter, such as at least one RF transmitter operable to transmit over the contention-free based radio frequency spectrum and/or the contention based radio frequency spectrum. The transmitter module 1030 may be used to transmit various types of data and/or control signals (i.e., transmissions) over one or more communication links of a wireless communication system, such as one or more communication links 125 of the wireless communication system 100, 200, and/or 300 described with reference to FIG. 1, 2, and/or 3. The communication links 125 may be established over the contention-free based radio frequency spectrum and/or the contention based radio frequency spectrum.

In some examples, the wireless communication management module 1020 may be used to manage the receipt of wireless communications via the receiver module 1010 and/or to manage the transmission of wireless communications via the transmitter module 1030. Managing the receipt of wireless communications via the receiver module 1010 may include managing the receipt of wireless communications received in different downlink subframes and from different cells (e.g., from different serving cells, where each serving cell communicates over a different component carrier). In some examples, two or more cells may be of different carrier frequencies, as might be found in a carrier aggregation and/or dual-connectivity (e.g., multi-flow) mode of communication. In other examples, two or more cells may be of a same carrier frequency, as might be found in a coordinated multipoint (CoMP) mode of communication. Regardless, each component carrier may be received over contention-free based radio frequency spectrum or contention based radio frequency spectrum, and a set of component carriers involved in a particular mode of communication may all be received over contention-free based radio frequency spectrum, all be received over contention based radio frequency spectrum, or be received over a combination of contention-free based radio frequency spectrum and contention based radio frequency spectrum.

Managing the transmission of wireless communications via the transmitter module 1030 may include managing the transmission of wireless communications in different uplink subframes and to different cells. In some examples, there may be a conflict for a resource in a uplink subframe, such as a conflict including at least a conflict between reporting first uplink control information for a first cell and reporting second uplink control information for a second cell. The first uplink control information for the first cell may be generated based on measurements obtained during receipt of a respective downlink subframe from the first cell, and the second uplink control information for the second cell may be generated based on measurements obtained during receipt of a respective downlink subframe from the second cell. To resolve the conflict for the resource in the uplink subframe, the wireless communication management module 1020 may, for example, prioritize the reporting of uplink control information.

Figure 11:
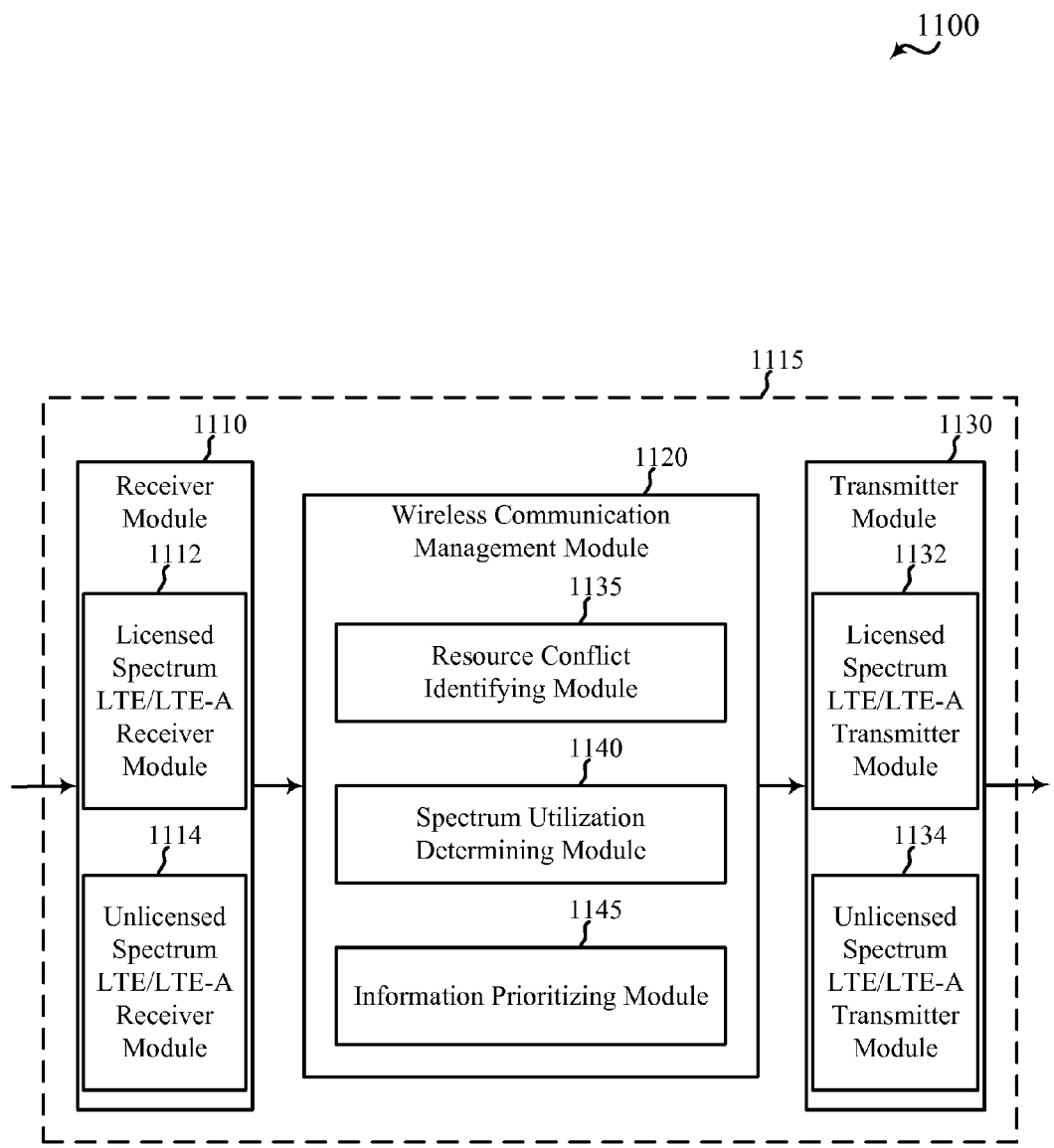
FIG. 11 shows a block diagram of an apparatus for use in wireless communication, in accordance with various aspects of the present disclosure.

FIG. 11 shows a block diagram 1100 of an apparatus 1115 for use in wireless communication, in accordance with various aspects of the present disclosure. In some examples, the apparatus 1115 may be an example of aspects of one or more of the UEs 115, 215, and/or 315 described with reference to FIG. 1, 2, and/or 3, and/or aspects of one or more of the apparatus 1015 described with reference to FIG. 10. The apparatus 1115 may also be a processor. The apparatus 1115 may include a receiver module 1110, a wireless communication management module 1120, and/or a transmitter module 1130. Each of these components may be in communication with each other.

The components of the apparatus 1115 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110 may include at least one RF receiver, such as at least one RF receiver operable to receive transmissions over contention-free based radio frequency spectrum (e.g., radio frequency spectrum for which apparatuses do not contend for access because the radio frequency spectrum is licensed to particular users for particular uses) and/or contention based radio frequency spectrum (e.g., radio frequency spectrum for which apparatuses contend for access because the radio frequency spectrum is open to unlicensed use). In some examples, both the contention-free based radio frequency spectrum and the contention based radio frequency spectrum may be used for LTE/LTE-A communications, as described, for example, with reference to FIG. 2 and/or 3. The receiver module 1110 may in some cases include separate receivers for the contention-free based radio frequency spectrum and the contention based radio frequency spectrum. The separate receivers may, in some examples, take the form of a licensed spectrum LTE/LTE-A receiver module 1112 for communicating over the contention-free based radio frequency spectrum, and an unlicensed spectrum LTE/LTE-A receiver module 1114 for communicating over the contention based radio frequency spectrum. The receiver module 1110, including the licensed spectrum LTE/LTE-A receiver module 1112 and/or the unlicensed spectrum LTE/LTE-A receiver module 1114, may be used to receive various types of data and/or control signals (i.e., transmissions) over one or more communication links of a wireless communication system, such as one or more communication links 125 of the wireless communication system 100, 200, and/or 300 described with reference to FIG. 1, 2, and/or 3. The communication links 125 may be established over the contention-free based radio frequency spectrum and/or the contention based radio frequency spectrum.

In some examples, the transmitter module 1130 may include at least one RF transmitter, such as at least one RF transmitter operable to transmit over the contention-free based radio frequency spectrum and/or the contention based radio frequency spectrum. In some examples, both the contention-free based radio frequency spectrum and the contention based radio frequency spectrum may be used for LTE/LTE-A communications, as described, for example, with reference to FIG. 2 and/or 3. The transmitter module 1130 may in some cases include separate transmitters for the contention-free based radio frequency spectrum and the contention based radio frequency spectrum. The separate transmitters may, in some examples, take the form of a licensed spectrum LTE/LTE-A transmitter module 1132 for communicating over the contention-free based radio frequency spectrum, and an unlicensed spectrum LTE/LTE-A transmitter module 1134 for communicating over the contention based radio frequency spectrum. The transmitter module 1130, including the licensed spectrum LTE/LTE-A transmitter module 1132 and/or the unlicensed spectrum LTE/LTE-A transmitter module 1134, may be used to transmit various types of data and/or control signals (i.e., transmissions) over one or more communication links of a wireless communication system, such as one or more communication links 125 of the wireless communication system 100, 200, and/or 300 described with reference to FIG. 1, 2, and/or 3. The communication links 125 may be established over the contention-free based radio frequency spectrum and/or the contention based radio frequency spectrum.

In some examples, the wireless communication management module 1120 may be an example of one or more aspects of the wireless communication management module 1020 described with reference to FIG. 10. The wireless communication management module 1120 may include a resource conflict identifying module 1135, a spectrum utilization determining module 1140, and/or an information prioritizing module 1145. Each of these components may be in communication with each other.

The resource conflict identifying module 1135 may be used to identify a conflict for a resource in an uplink subframe. The conflict may include at least a conflict between reporting first uplink control information for a first cell and reporting second uplink control information for a second cell.

The spectrum utilization determining module 1140 may be used to determine whether one or more cells utilize contention-free based radio frequency spectrum or contention based radio frequency spectrum. For example, the spectrum utilization determining module 1140 may be used to determine whether the first cell is a cell that utilizes contention-free based radio frequency spectrum or contention based radio frequency spectrum. The spectrum utilization determining module 1140 may also be used to determine whether the second cell is a cell that utilizes contention-free based radio frequency spectrum or contention based radio frequency spectrum.

The information prioritizing module 1145 may be used to prioritize, in the conflict for the resource in the uplink subframe, the reporting of the second uplink control information for the second cell based at least in part on the utilization of the contention based radio frequency spectrum by the second cell.

In some examples, the first cell and the second cell may be of different carrier frequencies, as might be found in a carrier aggregation and/or dual-connectivity (e.g., multi-flow) mode of communication. In other examples of the method 1600, the first cell and the second cell may be of a same carrier frequency, as might be found in a CoMP mode of communication.

In some examples, the first uplink control information and/or the second uplink control information may include channel state information (CSI), a sounding reference signal (SRS), and/or scheduling request (SR) control information (e.g., under multi-flow operation). When uplink control information includes CSI, the CSI may include, for example, at least one of a rank indicator (RI), a precoding type indicator (PTI), a wideband precoding matrix indicator (PMI), a wideband channel quality indicator (CQI), a wideband CQI with PMI, a subband CQI, or a subband CQI with PMI. In some examples, the prioritizing performed by the information prioritizing module 1145 may be performed for one or more types of uplink control information (e.g., top priority types, such as a rank indicator (RI), a precoding type indicator (PTI), or a wideband precoding matrix indicator (PMI) (e.g., reporting types of 3, 5, 6, 2a)). In another example, one or more type of uplink control information may not be prioritized by the information prioritizing module 1145, and the priority of the one or more type of uplink control information may be determined based at least in part on the serving cell index (e.g., a lower serving cell index may be assigned a higher priority) of each cell reporting the one or more type of uplink control information.

In some examples, the spectrum utilization determining module 1140 may determine the first cell is a cell that utilizes contention-free based radio frequency spectrum and the second cell is a cell that utilizes contention based radio frequency spectrum. In these examples, and when the first uplink control information and the second uplink control information each include CSI, the information prioritizing module 1145 may prioritize the reporting of the second uplink control information over the reporting of the second uplink control information despite a first reporting type of CSI for the first cell having a same priority level or higher priority level relative to a second reporting type of CSI for the second cell.

In certain examples, the first cell may be one of a first plurality of cells operating in contention-free based radio frequency spectrum, and/or the second cell may be one of a second plurality of cells operating in contention based radio frequency spectrum. In these examples, the information prioritizing module 1145 may in some cases prioritize the reporting of uplink control information so that the reporting of uplink control information for the second cell (or the second plurality of cells) is given priority over the reporting of uplink control information for the first cell (or the first plurality of cells). In other cases, the information prioritizing module 1145 may classify the second cell (or each cell of the second plurality of cells) as 1) a cell for which contention for the contention based radio frequency spectrum succeeded (e.g., a cell for which a valid measurement subframe containing an RS to be measured may have been transmitted, and for which a valid measurement or measurements may have been obtained for generating uplink control information), or 2) a cell for which contention for the contention based radio frequency spectrum failed (e.g., a cell for which a valid measurement subframe containing an RS to be measured would not have been transmitted, and for which a valid measurement or measurements would not have been obtained for generating uplink control information). In these latter examples, the information prioritizing module 1145 may prioritize the reporting of uplink control information for any cell for which contention for contention based radio frequency spectrum to transmit a measurement subframe (e.g., a downlink subframe) succeeded over the reporting of uplink control information for the first cell (or the first plurality of cells), and prioritize the reporting of uplink control information for the first cell (or the first plurality of cells) over the reporting of uplink control information for any cell for which contention for contention based radio frequency spectrum to transmit a measurement subframe (e.g., a downlink subframe) failed.

In some examples, the wireless communication management module 1120 may include a cell index with a reporting of the uplink control information. For example, the wireless communication management module 1120 may include a second cell index, identifying the second cell, with a reporting of the second uplink control information. The included cell index may be used by a base station to determine the cell to which the uplink control information pertains. For example, the cell index may be used by the base station to determine the cell to which the uplink control information pertains when the apparatus 1115 and the base station are aligned. The alignment of the apparatus 1115 and the base station may be important when determining whether the cell using the contention based radio frequency spectrum is successful contending for access of the contention based radio frequency spectrum. The determination of whether the cell using the contention based radio frequency spectrum is successful contending for access of the contention based radio frequency spectrum may be based at least in part on signaling and/or reference signaling (CUBS 545 and/or CCA Exempt Transmission (CET) signaling). When the apparatus 1115 and the base station are aligned, the probability of detecting the signaling and/or reference signaling may be reliable (e.g., above a probability threshold). However, when the apparatus 1115 and the base station are not aligned, the probability of detecting the signaling and/or reference signaling may not be reliable (e.g., below a probability threshold). When the apparatus 1115 and the base station are not aligned, a base station may use blind detection to determine the cell to which the uplink control information pertains. In one example, a maximum payload may be assumed for each cell, and a cell index may be included in a CSI report to indicate which cell is being reported, even though this may increase uplink overhead.

Figure 12:
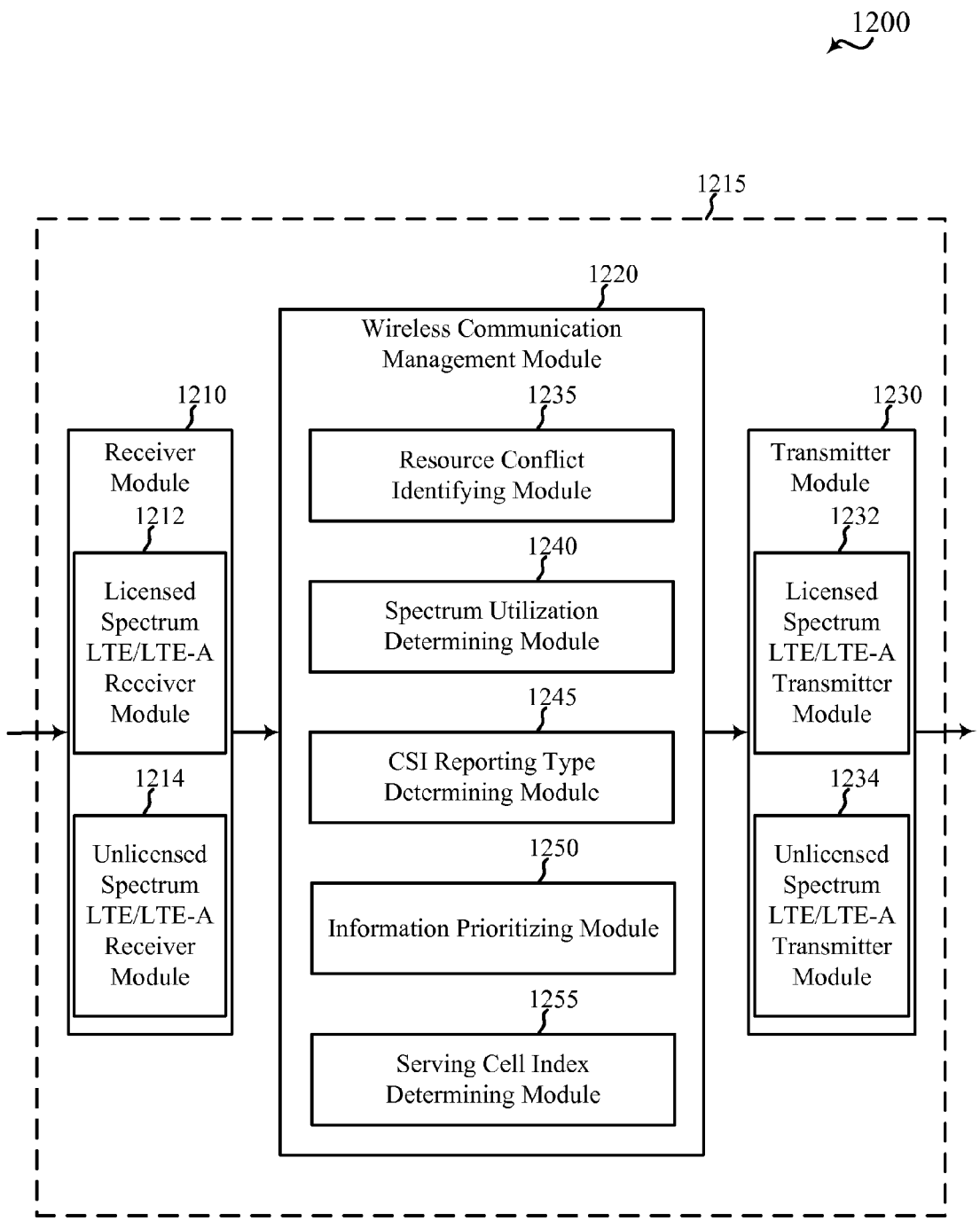
FIG. 12 shows a block diagram of an apparatus for use in wireless communication, in accordance with various aspects of the present disclosure.

FIG. 12 shows a block diagram 1200 of an apparatus 1215 for use in wireless communication, in accordance with various aspects of the present disclosure. In some examples, the apparatus 1215 may be an example of aspects of one or more of the UEs 115, 215, and/or 315 described with reference to FIG. 1, 2, and/or 3, and/or aspects of one or more of the apparatuses 1015 and/or 1115 described with reference to FIG. 10 and/or 11. The apparatus 1215 may also be a processor. The apparatus 1215 may include a receiver module 1210, a wireless communication management module 1220, and/or a transmitter module 1230. Each of these components may be in communication with each other.

The components of the apparatus 1215 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1210 may include at least one RF receiver, such as at least one RF receiver operable to receive transmissions over contention-free based radio frequency spectrum (e.g., radio frequency spectrum for which apparatuses do not contend for access because the radio frequency spectrum is licensed to particular users for particular uses) and/or contention based radio frequency spectrum (e.g., radio frequency spectrum for which apparatuses contend for access because the radio frequency spectrum is open to unlicensed use). In some examples, both the contention-free based radio frequency spectrum and the contention based radio frequency spectrum may be used for LTE/LTE-A communications, as described, for example, with reference to FIG. 2 and/or 3. The receiver module 1210 may in some cases include separate receivers for the contention-free based radio frequency spectrum and the contention based radio frequency spectrum. The separate receivers may, in some examples, take the form of a licensed spectrum LTE/LTE-A receiver module 1212 for communicating over the contention-free based radio frequency spectrum, and an unlicensed spectrum LTE/LTE-A receiver module 1214 for communicating over the contention based radio frequency spectrum. The receiver module 1210, including the licensed spectrum LTE/LTE-A receiver module 1212 and/or the unlicensed spectrum LTE/LTE-A receiver module 1214, may be used to receive various types of data and/or control signals (i.e., transmissions) over one or more communication links of a wireless communication system, such as one or more communication links 125 of the wireless communication system 100, 200, and/or 300 described with reference to FIG. 1, 2, and/or 3. The communication links 125 may be established over the contention-free based radio frequency spectrum and/or the contention based radio frequency spectrum.

In some examples, the transmitter module 1230 may include at least one RF transmitter, such as at least one RF transmitter operable to transmit over the contention-free based radio frequency spectrum and/or the contention based radio frequency spectrum. In some examples, both the contention-free based radio frequency spectrum and the contention based radio frequency spectrum may be used for LTE/LTE-A communications, as described, for example, with reference to FIG. 2 and/or 3. The transmitter module 1230 may in some cases include separate transmitters for the contention-free based radio frequency spectrum and the contention based radio frequency spectrum. The separate transmitters may, in some examples, take the form of a licensed spectrum LTE/LTE-A transmitter module 1232 for communicating over the contention-free based radio frequency spectrum, and an unlicensed spectrum LTE/LTE-A transmitter module 1234 for communicating over the contention based radio frequency spectrum. The transmitter module 1230, including the licensed spectrum LTE/LTE-A transmitter module 1232 and/or the unlicensed spectrum LTE/LTE-A transmitter module 1234, may be used to transmit various types of data and/or control signals (i.e., transmissions) over one or more communication links of a wireless communication system, such as one or more communication links 125 of the wireless communication system 100, 200, and/or 300 described with reference to FIG. 1, 2, and/or 3. The communication links 125 may be established over the contention-free based radio frequency spectrum and/or the contention based radio frequency spectrum.

In some examples, the wireless communication management module 1220 may be an example of one or more aspects of the wireless communication management module 1020 and/or 1120 described with reference to FIG. 10 and/or 11. The wireless communication management module 1220 may include a resource conflict identifying module 1235, a spectrum utilization determining module 1240, a CSI reporting type determining module 1245, an information prioritizing module 1250, and/or a serving cell index determining module 1255. Each of these components may be in communication with each other.

The resource conflict identifying module 1235 may be used to identify a conflict for a resource in an uplink subframe. The conflict may include at least a conflict between reporting first uplink control information for a first cell and reporting second uplink control information for a second cell.

The spectrum utilization determining module 1240 may be used to determine whether one or more cells utilize contention-free based radio frequency spectrum or contention based radio frequency spectrum. For example, the spectrum utilization determining module 1240 may determine whether the first cell is a cell that utilizes contention-free based radio frequency spectrum or contention based radio frequency spectrum. The spectrum utilization determining module 1240 may also be used to determine whether the second cell is a cell that utilizes contention-free based radio frequency spectrum or contention based radio frequency spectrum.

The CSI reporting type determining module 1245 may determine a first priority level of a first reporting type of CSI for the first cell; determine a second priority level of a second reporting type of CSI for the second cell; and determine the priority level of the first reporting type of CSI for the first cell relative to the priority level of the second reporting type of CSI for the second cell.

In some examples, the first priority level of the first reporting type of CSI for the first cell and/or the second priority level of the second reporting type of CSI for the second cell, may be determined to be: a top priority level when a reporting type of CSI includes at least one of a rank indicator (RI), a precoding type indicator (PTI), or a wideband precoding matrix indicator (PMI) (e.g., a reporting type of 3, 5, 6, or 2a); a medium priority level when a reporting type of CSI includes at least one of a wideband channel quality indication (CQI), or a wideband CQI with PMI (e.g., a reporting type of 2, 2b, 2c, or 4); and/or a low priority level when a reporting type of CSI includes at least one of a subband CQI, or a subband CQI with PMI (e.g., a reporting type of 1, 1a).

The information prioritizing module 1250 may be used to prioritize, in the conflict for the resource in the uplink subframe, the reporting of the second uplink control information for the second cell. When the first priority level of the first reporting type of CSI differs from the second priority level of the first reporting type of CSI, the information prioritizing module 1250 may prioritize, in the conflict for the resource in the uplink subframe, the reporting of the second uplink control information for the second cell based at least in part on the utilization of the contention based radio frequency spectrum by the second cell, and based at least in part on the first priority level of the first reporting type of CSI for the first cell relative to the second priority level of the second reporting type of CSI for the second cell. In some examples, it may be determined that each of the first cell and the second cell are cells that utilize the contention based radio frequency spectrum, and the reporting of the first uplink control information for the first cell and the reporting of the second uplink control information for the second cell may be prioritized over the reporting of a third uplink control information for a third cell, which third cell utilizes contention-free based radio frequency spectrum. The reporting of the first uplink control information for the first cell and the second uplink control information for the second cell may then be prioritized with respect to each other based at least in part on the first priority level of the first reporting type of CSI for the first cell relative to the second priority level of the second reporting type of CSI for the second cell.

When it is determined that each of the first cell and the second cell are cells that utilize the contention based radio frequency spectrum, and when the first priority level of the first reporting type of CSI and the second priority level of the second reporting type of CSI are a same priority level, the serving cell index determining module 1255 may determine a first serving cell index of the first cell and a second serving cell index of the second cell. The information prioritizing module 1250 may then prioritize, in the conflict for the resource in the uplink subframe, the reporting of uplink control information based at least in part on the utilization of the contention based radio frequency spectrum by the second cell, and based at least in part on the first serving cell index and the second serving cell index. In some examples, the reporting of the first uplink control information for the first cell and the reporting of the second uplink control information for the second cell may be prioritized over the reporting of a third uplink control information for a third cell, which third cell utilizes contention-free based radio frequency spectrum. The reporting of the first uplink control information for the first cell and the second uplink control information for the second cell may then be prioritized with respect to each other based on the first cell index and the second cell index. For example, when the second cell index is lower than the first serving cell index, the reporting of the second uplink control information for the second cell may be prioritized over the reporting of the first uplink control information for the first cell; and when the second cell index is higher than the first serving cell index, the reporting of the first uplink control information for the first cell may be prioritized over the reporting of the second uplink control information for the second cell.

In some examples, the first cell and the second cell may be of different carrier frequencies, as might be found in a carrier aggregation and/or dual-connectivity (e.g., multi-flow) mode of communication. In other examples, the first cell and the second cell may be of a same carrier frequency, as might be found in a CoMP mode of communication.

In some examples, the wireless communication management module 1220 may include a cell index with a reporting of the uplink control information. For example, the wireless communication management module 1220 may include a second cell index, identifying the second cell, with a reporting of the second uplink control information. The included cell index may be used by a base station to determine the cell to which the uplink control information pertains. Alternately, a base station may use blind detection to determine the cell to which the uplink control information pertains. In one example, a maximum payload may be assumed for each cell, and a cell index may be included in a CSI report to indicate which cell is being reported, even though this may increase uplink overhead.

Figure 13:
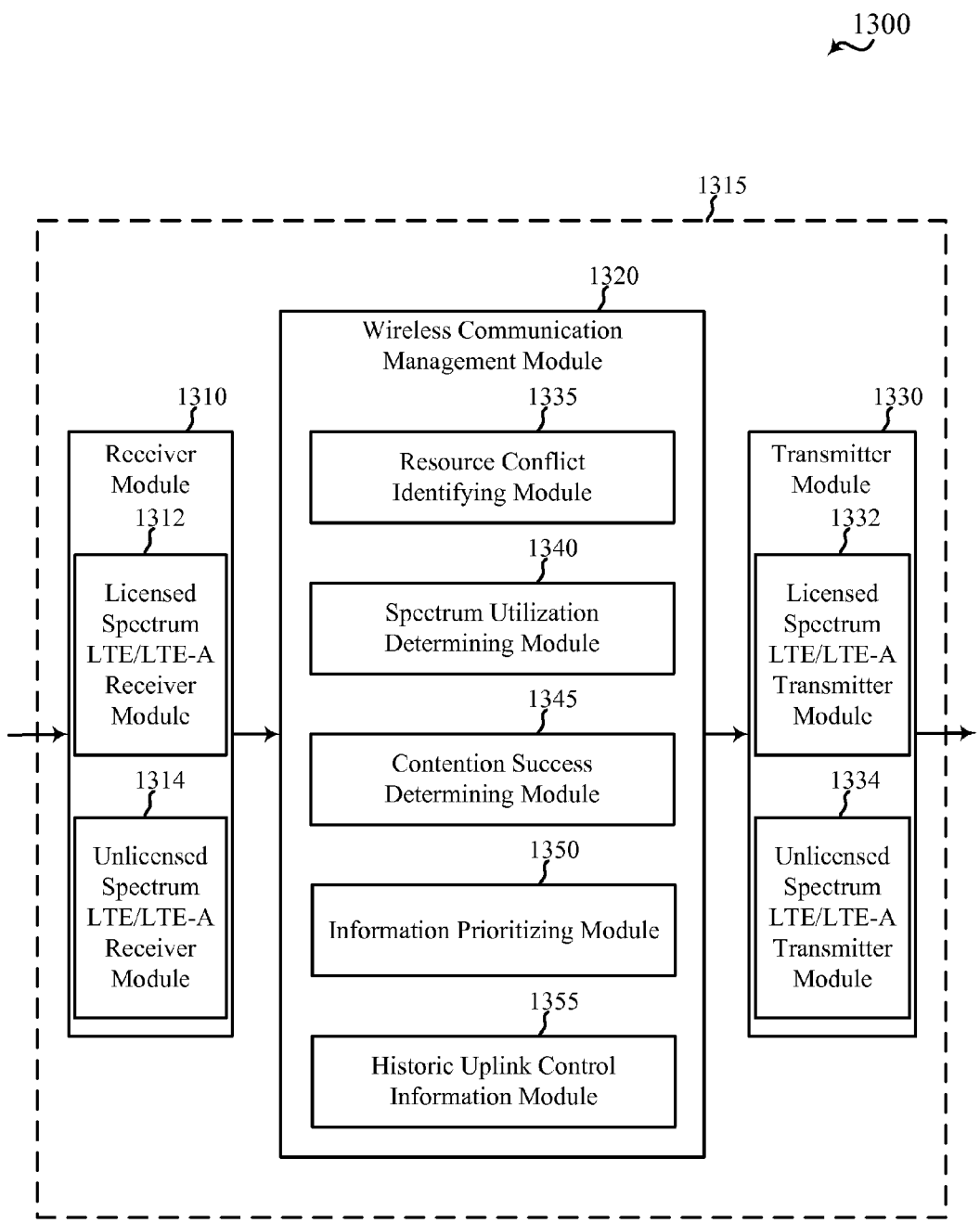
FIG. 13 shows a block diagram of an apparatus for use in wireless communication, in accordance with various aspects of the present disclosure.

FIG. 13 shows a block diagram 1300 of an apparatus 1315 for use in wireless communication, in accordance with various aspects of the present disclosure. In some examples, the apparatus 1315 may be an example of aspects of one or more of the UEs 115, 215, and/or 315 described with reference to FIG. 1, 2, and/or 3, and/or aspects of one or more of the apparatuses 1015, 1115, and/or 1215 described with reference to FIG. 10, 11, and/or 12. The apparatus 1315 may also be a processor. The apparatus 1315 may include a receiver module 1310, a wireless communication management module 1320, and/or a transmitter module 1330. Each of these components may be in communication with each other.

The components of the apparatus 1315 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1310 may include at least one RF receiver, such as at least one RF receiver operable to receive transmissions over contention-free based radio frequency spectrum (e.g., radio frequency spectrum for which apparatuses do not contend for access because the radio frequency spectrum is licensed to particular users for particular uses) and/or contention based radio frequency spectrum (e.g., radio frequency spectrum for which apparatuses contend for access because the radio frequency spectrum is open to unlicensed use). In some examples, both the contention-free based radio frequency spectrum and the contention based radio frequency spectrum may be used for LTE/LTE-A communications, as described, for example, with reference to FIG. 2 and/or 3. The receiver module 1310 may in some cases include separate receivers for the contention-free based radio frequency spectrum and the contention based radio frequency spectrum. The separate receivers may, in some examples, take the form of a licensed spectrum LTE/LTE-A receiver module 1312 for communicating over the contention-free based radio frequency spectrum, and an unlicensed spectrum LTE/LTE-A receiver module 1314 for communicating over the contention based radio frequency spectrum. The receiver module 1310, including the licensed spectrum LTE/LTE-A receiver module 1312 and/or the unlicensed spectrum LTE/LTE-A receiver module 1314, may be used to receive various types of data and/or control signals (i.e., transmissions) over one or more communication links of a wireless communication system, such as one or more communication links 125 of the wireless communication system 100, 200, and/or 300 described with reference to FIG. 1, 2, and/or 3. The communication links 125 may be established over the contention-free based radio frequency spectrum and/or the contention based radio frequency spectrum.

In some examples, the transmitter module 1330 may include at least one RF transmitter, such as at least one RF transmitter operable to transmit over the contention-free based radio frequency spectrum and/or the contention based radio frequency spectrum. In some examples, both the contention-free based radio frequency spectrum and the contention based radio frequency spectrum may be used for LTE/LTE-A communications, as described, for example, with reference to FIG. 2 and/or 3. The transmitter module 1330 may in some cases include separate transmitters for the contention-free based radio frequency spectrum and the contention based radio frequency spectrum. The separate transmitters may, in some examples, take the form of a licensed spectrum LTE/LTE-A transmitter module 1332 for communicating over the contention-free based radio frequency spectrum, and an unlicensed spectrum LTE/LTE-A transmitter module 1334 for communicating over the contention based radio frequency spectrum. The transmitter module 1330, including the licensed spectrum LTE/LTE-A transmitter module 1332 and/or the unlicensed spectrum LTE/LTE-A transmitter module 1334, may be used to transmit various types of data and/or control signals (i.e., transmissions) over one or more communication links of a wireless communication system, such as one or more communication links 125 of the wireless communication system 100, 200, and/or 300 described with reference to FIG. 1, 2, and/or 3. The communication links 125 may be established over the contention-free based radio frequency spectrum and/or the contention based radio frequency spectrum.

In some examples, the wireless communication management module 1320 may be an example of one or more aspects of the wireless communication management module 1020, 1120, and/or 1220 described with reference to FIG. 10, 11, and/or 12. The wireless communication management module 1320 may include a resource conflict identifying module 1335, a spectrum utilization determining module 1340, a contention success determining module 1345, an information prioritizing module 1350, and/or a historic uplink control information module 1355. Each of these components may be in communication with each other.

The resource conflict identifying module 1335 may be used to identify a conflict for a resource in an uplink subframe. The conflict may include at least a conflict between reporting first uplink control information for a first cell and reporting second uplink control information for a second cell.

The spectrum utilization determining module 1340 may be used to determine whether the first cell is a cell that utilizes contention-free based radio frequency spectrum or contention based radio frequency spectrum. The spectrum utilization determining module 1340 may also be used to determine whether the second cell is a cell that utilizes contention-free based radio frequency spectrum or contention based radio frequency spectrum.

The contention success determining module 1345 may identify a downlink subframe of a cell that utilizes contention based radio frequency spectrum, which downlink subframe may be used to obtain measurements to generate uplink control information for the uplink subframe, and may determine whether contention for the contention based radio frequency spectrum to transmit the downlink subframe succeeded or failed. The determination may in some cases be made based on signaling received from a base station, which signaling indicates the success or failure of contention for the contention based radio frequency spectrum to transmit the downlink subframe by the cell. The determination may in other cases be made based on the presence of a reference signal transmitted by the cell (e.g., the CUBS 545 described with reference to FIG. 5A and/or one or more other signals), which reference signal indicates the success or failure of contention for the contention based radio frequency spectrum for downlink transmissions by the cell. For example, when the reference signal is detected as present, contention for the contention based radio frequency spectrum to transmit the downlink subframe may be determined to have succeeded. In contrast, when the reference signal is not detected as present, contention for the contention based radio frequency spectrum to transmit the downlink subframe may be determined to have failed. The signaling and/or reference signal transmission of the base station helps to align the base station and the apparatus 1315 with respect to which cell a report of uplink control information corresponds. Alignment may also be based on blind detection, by a base station, of the cell to which uplink control information corresponds, and/or based on the signaling of contention success status information by the base station.

The information prioritizing module 1350 may be used to prioritize, in the conflict for the resource in the uplink subframe, the reporting of the second uplink control information for the second cell. By determining whether a report of uplink control information (e.g., a CSI feedback instance) is under a valid measurement subframe (e.g., the downlink subframe identified by the contention success determining module 1345), more advanced rules for prioritizing the reporting of uplink control information may be developed. For example, when it is determined that contention for the contention based radio frequency spectrum to transmit the downlink subframe of the second cell succeeded (and thus, a valid measurement subframe containing an RS to be measured may have been transmitted, and a valid measurement or measurements may have been obtained for generating uplink control information), the information prioritizing module 1350 may prioritize, in the conflict for the resource in the uplink subframe, the reporting of the second uplink control information for the second cell based at least in part on the utilization of the contention based radio frequency spectrum by the second cell. The utilization of the contention based radio frequency spectrum by the second cell may include the success of the contention for the contention based radio frequency spectrum. For example, when the first cell is determined to be a cell that utilizes contention-free based radio frequency spectrum and the second cell is determined to be a cell that utilizes contention based radio frequency spectrum, the reporting of the second uplink control information for the second cell may be given a higher priority than the reporting of the first uplink control information for the first cell. When the first cell and the second cell are each determined to be cells that utilize contention based radio frequency spectrum, the reporting of the second uplink control information for the second cell may be given a higher priority than the reporting of third uplink control information for a third cell that utilizes contention-free based radio frequency spectrum, and may be given a priority with respect to the reporting of the first uplink control information for the first cell based on the success or failure of the first cell to contend for the contention based radio frequency spectrum and transmit a downlink subframe (and/or based on a first priority level of a first reporting type of CSI for the first cell relative to a second priority level of a second reporting type of CSI for the second cell, and/or based on a comparison of a first serving cell for the first cell and a second serving cell index for the second cell).

When it is determined that contention for the contention based radio frequency spectrum to transmit the downlink subframe of the second cell failed (and thus, a valid measurement subframe containing an RS to be measured would not have been transmitted, and a valid measurement or measurements would not have been obtained for generating uplink control information), the information prioritizing module 1350 may prioritize, in the conflict for the resource in the uplink subframe, the reporting of the second uplink control information for the second cell based at least in part on the utilization of the contention based radio frequency spectrum by the second cell. The utilization of the contention based radio frequency spectrum by the second cell may include the failure of the contention for the contention based radio frequency spectrum. In some cases, the prioritizing may include giving the reporting of the second uplink control information for the second cell priority over the reporting of uplink control information for one or more cells that utilizes contention-free based radio frequency spectrum. In other cases, the prioritizing may include lowering a priority of the reporting of the second uplink control information for the second cell. The priority of the reporting of the second uplink control information for the second cell may in some cases be lowered such that the priority of reporting the second uplink control information for the second cell is lower than the priority of reporting uplink control information for one or more cells that utilize contention-free based spectrum and/or lower than the priority of reporting uplink control information for one or more cells that utilize contention based spectrum and have a higher serving cell index than the second cell. In other cases, the second uplink control information for the second cell may not be reported, and the reporting of the second uplink control information for the second cell may be omitted from the prioritizing of reporting other uplink control information. In other cases, the historic uplink control information module 1355 may be used to access historic second uplink control information for the second cell. The historic second uplink control information for the second cell may be based on measurements obtained during receipt of a previous downlink subframe for the second cell (e.g., a previous valid downlink subframe). In these cases, the prioritizing undertaken by the information prioritizing module 1350 may be similar to the prioritizing described in the preceding paragraph, with the prioritizing of the second uplink control information for the second cell including the prioritizing of the historic second uplink control information for the second cell. Alternately, the reporting of the historic second uplink control information for the second cell may be given a lower priority than the reporting of the uplink control information for the first cell.

In some examples, the first cell and the second cell may be of different carrier frequencies, as might be found in a carrier aggregation and/or dual-connectivity (e.g., multi-flow) mode of communication. In other examples, the first cell and the second cell may be of a same carrier frequency, as might be found in a CoMP mode of communication.

In some examples, the first uplink control information and/or the second uplink control information may include CSI, an SRS, and/or SR control information (e.g., under multiflow operation). When uplink control information includes CSI, the CSI may include, for example, at least one of an RI, a PTI, a wideband PMI, a wideband CQI, a wideband CQI with PMI, a subband CQI, or a subband CQI with PMI. In some examples, the prioritizing performed by the information prioritizing module 1350 may be performed for one or more types of uplink control information (e.g., top priority types, such as a rank indicator (RI), a precoding type indicator (PTI), or a wideband precoding matrix indicator (PMI) (e.g., reporting types of 3, 5, 6, 2a)). In another example, one or more type of uplink control information may not be prioritized by the information prioritizing module 1350, and the priority of the one or more type of uplink control information may be determined based at least in part on the serving cell index (e.g., a lower serving cell index may be assigned a higher priority) of each cell reporting the one or more type of uplink control information.

In some examples, the wireless communication management module 1320 may include a cell index with a reporting of the uplink control information. For example, the wireless communication management module 1320 may include a second cell index, identifying the second cell, with a reporting of the second uplink control information. The included cell index may be used by a base station to determine the cell to which the uplink control information pertains. Alternately, a base station may use blind detection to determine the cell to which the uplink control information pertains. In one example, a maximum payload may be assumed for each cell, and a cell index may be included in a CSI report to indicate which cell is being reported, even though this may increase uplink overhead.

Figure 14:
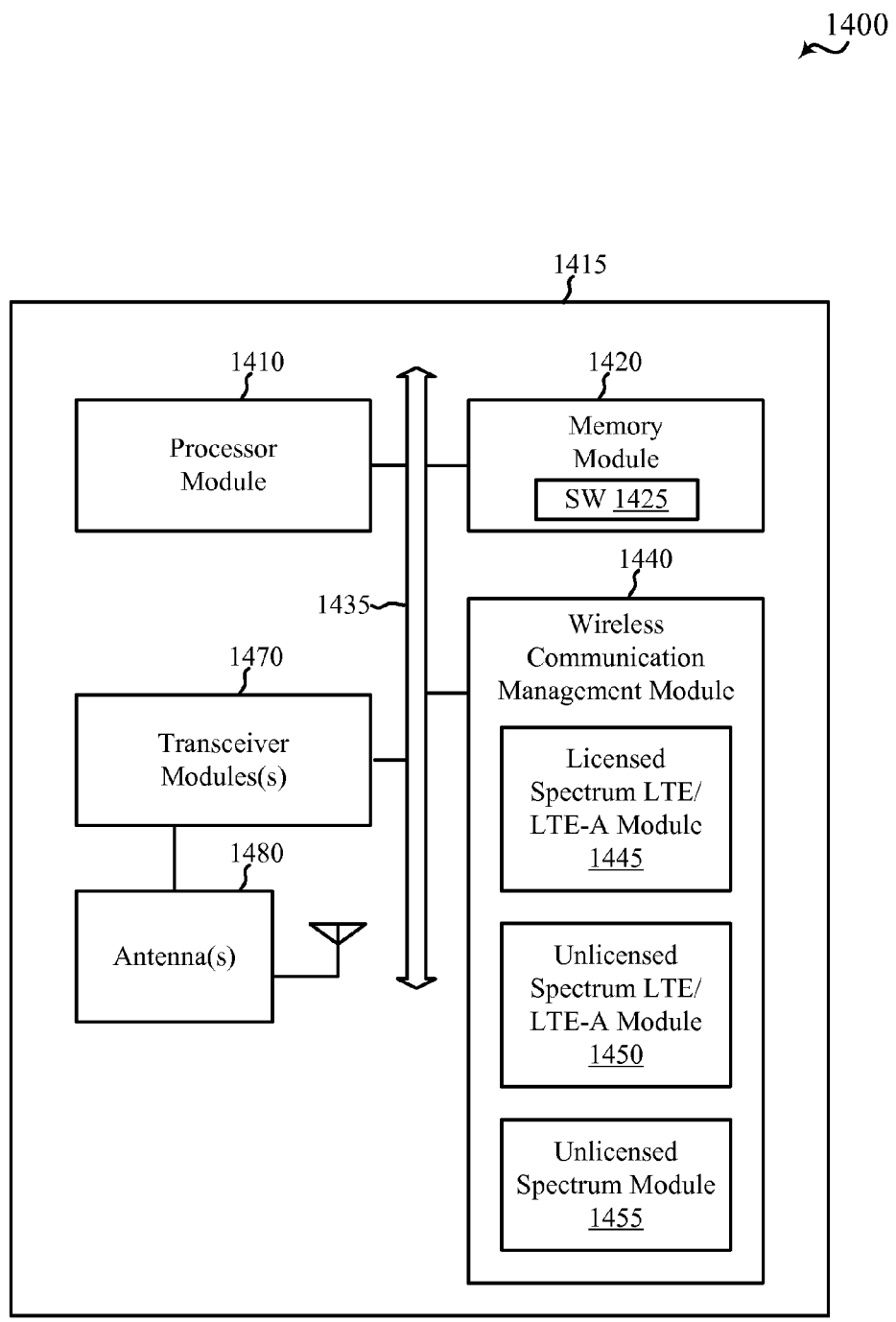
FIG. 14 shows a block diagram of a UE for use in wireless communication, in accordance with various aspects of the present disclosure.

FIG. 14 shows a block diagram 1400 of a UE 1415 for use in wireless communication, in accordance with various aspects of the present disclosure. The UE 1415 may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The UE 1415 may, in some examples, have an internal power supply (not shown), such as a small battery, to facilitate mobile operation. In some examples, the UE 1415 may be an example of one or more aspects of one of the UEs 115, 215, and/or 315 described with reference to FIG. 1, 2, and/or 3, and/or one of the apparatuses 1015, 1115, 1215, and/or 1315 described with reference to FIG. 10, 11, 12, and/or 13. The UE 1415 may be configured to implement at least some of the features and functions described with reference to FIG. 1, 2, 3, 4, 5A, 5B, 6, 7, 8, 9, 10, 11, 12, and/or 13.

The UE 1415 may include a processor module 1410, a memory module 1420, at least one transceiver module (represented by transceiver module(s) 1470), at least one antenna (represented by antenna(s) 1480), and/or a wireless communication management module 1440. Each of these components may be in communication with each other, directly or indirectly, over one or more buses 1435.

The memory module 1420 may include random access memory (RAM) and/or read-only memory (ROM). The memory module 1420 may store computer-readable, computer-executable software (SW) code 1425 containing instructions that are configured to, when executed, cause the processor module 1410 to perform various functions described herein for communicating over (or managing communications over) contention-free based radio frequency spectrum (e.g., radio frequency spectrum for which apparatuses do not contend for access because the radio frequency spectrum is licensed to particular users for particular uses) and/or contention based radio frequency spectrum (e.g., radio frequency spectrum for which apparatuses contend for access because the radio frequency spectrum is open to unlicensed use). Alternatively, the software code 1425 may not be directly executable by the processor module 1410 but be configured to cause the UE 1415 (e.g., when compiled and executed) to perform various of the functions described herein.

The processor module 1410 may include an intelligent hardware device, e.g., a CPU, a microcontroller, an ASIC, etc. The processor module 1410 may process information received through the transceiver module(s) 1470 and/or information to be sent to the transceiver module(s) 1470 for transmission through the antenna(s) 1480. The processor module 1410 may handle, alone or in connection with the wireless communication management module 1440, various aspects of communicating over (or managing communications over) the contention-free based radio frequency spectrum and/or the contention based radio frequency spectrum.

The transceiver module(s) 1470 may include a modem configured to modulate packets and provide the modulated packets to the antenna(s) 1480 for transmission, and to demodulate packets received from the antenna(s) 1480. The transceiver module(s) 1470 may, in some examples, be implemented as one or more transmitter modules and one or more separate receiver modules. The transceiver module(s) 1470 may support communications in the contention-free based radio frequency spectrum and/or the contention based radio frequency spectrum. The transceiver module(s) 1470 may be configured to communicate bidirectionally, via the antenna(s) 1480, with one or more of the base stations 105, 205, and/or 1705 described with reference to FIG. 1, 2, and/or 3. While the UE 1415 may include a single antenna, there may be examples in which the UE 1415 may include multiple antennas 1480.

The wireless communication management module 1440 may be configured to perform and/or control some or all of the features and/or functions described with reference to FIG. 1, 2, 3, 4, 5A, 5B, 6, 7, 8, 9, 10, 11, 12, and/or 13 related to wireless communication over the contention-free based radio frequency spectrum and/or the contention based radio frequency spectrum. For example, the wireless communication management module 1440 may be configured to support a supplemental downlink mode, a carrier aggregation mode, and/or a standalone mode of operation using the contention based radio frequency spectrum. The wireless communication management module 1440 may include a licensed spectrum LTE/LTE-A module 1445 configured to handle LTE/LTE-A communications in the contention-free based radio frequency spectrum, an unlicensed spectrum LTE/LTE-A module 1450 configured to handle LTE/LTE-A communications in the contention based radio frequency spectrum, and/or an unlicensed module 1455 configured to handle communications other than LTE/LTE-A communications in the contention based radio frequency spectrum. In some examples, and by way of example, the wireless communication management module 1440 may be an example of one or more aspects of the wireless communication management module 1020, 1120, 1220, and/or 1320 described with reference to FIG. 10, 11, 12, and/or 13. The wireless communication management module 1440, or portions of it, may include a processor, and/or some or all of the functions of the wireless communication management module 1440 may be performed by the processor module 1410 and/or in connection with the processor module 1410.

Figure 15:
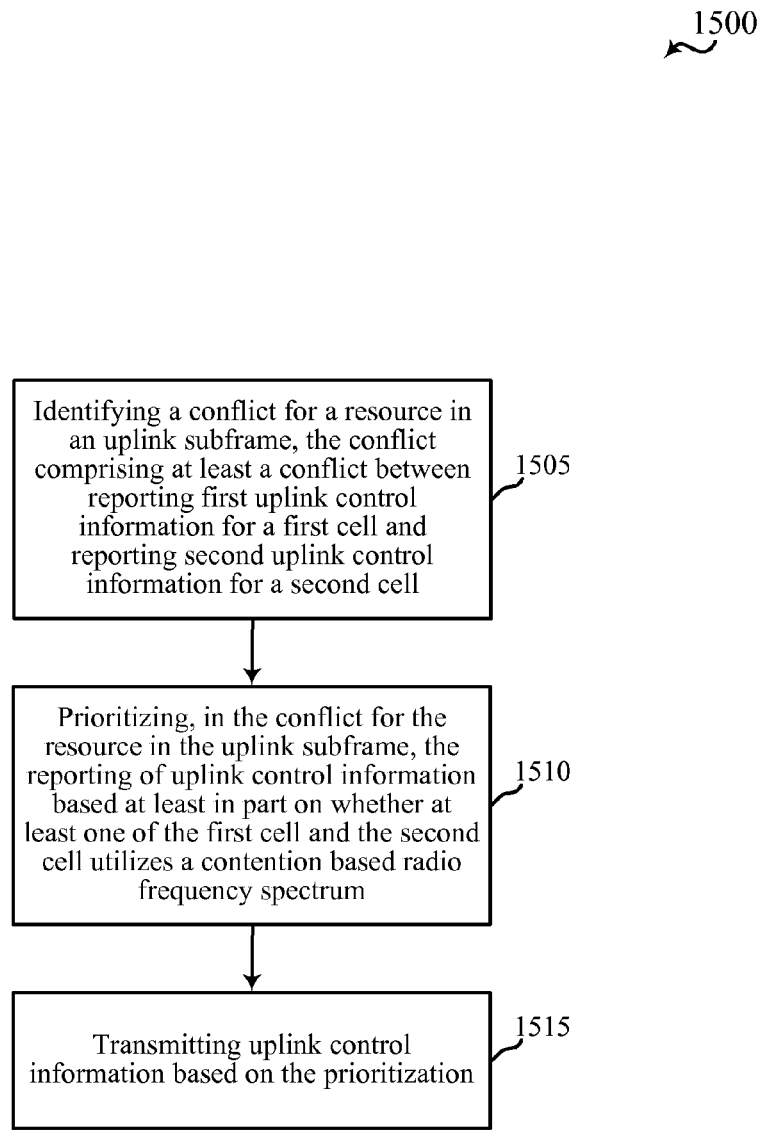
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115, 215, 315, and/or 1415 described with reference to FIG. 1, 2, 3, and/or 14, and/or aspects of one or more of the apparatuses 1015, 1115, 1215, and/or 1315 described with reference to FIG. 10, 11, 12, and/or 13. In some examples, a UE such as one of the UEs 115, 215, 315, or 1415 or an apparatus such as one of the apparatuses 1015, 1115, 1215, or 1315 may execute one or more sets of codes to control the functional elements of the UE or apparatus to perform the functions described below.

At block 1505, the method 1500 may include identifying a conflict for a resource in an uplink subframe. The conflict may include at least a conflict between reporting first uplink control information for a first cell and reporting second uplink control information for a second cell. The operation(s) at block 1505 may be performed using the wireless communication management module 1020, 1120, 1220, 1320, and/or 1420 described with reference to FIG. 10, 11, 12, 13, and/or 14, and/or the resource conflict identifying module 1135, 1235, and/or 1335 described with reference to FIG. 11, 12, and/or 13.

At block 1510, the method 1500 may include prioritizing, in the conflict for the resource in the uplink subframe, the reporting of uplink control information based at least in part on whether at least one of the first cell and the second cell utilizes a contention based radio frequency spectrum. The operation(s) at block 1510 may be performed using the wireless communication management module 1020, 1120, 1220, 1320, and/or 1420 described with reference to FIG. 10, 11, 12, 13, and/or 14, and/or the information prioritizing module 1145, 1250, and/or 1350 described with reference to FIG. 11, 12, and/or 13.

At block 1515, the method 1500 may include transmitting uplink control information based on the prioritization. The operation(s) at block 1515 may be performed using the transmitter module 1030, 1130, 1230, and/or 1330 described with reference to FIG. 10, 11, 12, and/or 13, and/or the transceiver module 1470 described with reference to FIG. 14.

In some examples, the method 1500 may include determining the second cell is a cell that utilizes contention based radio frequency spectrum, and prioritizing, in the conflict for the resource in the uplink subframe, the reporting of the second uplink control information for the second cell based at least in part on the utilization of the contention based radio frequency spectrum by the second cell.

In some examples of the method 1500, the first cell and the second cell may be of different carrier frequencies, as might be found in a carrier aggregation and/or dual-connectivity (e.g., multiflow) mode of communication. In other examples of the method 1500, the first cell and the second cell may be of a same carrier frequency, as might be found in a CoMP mode of communication.

In some examples of the method 1500, the first uplink control information and/or the second uplink control information may include CSI, an SRS, and/or SR control information (e.g., under multiflow operation). When uplink control information includes CSI, the CSI may include, for example, at least one of an RI, a PTI, a wideband PMI, a wideband CQI, a wideband CQI with PMI, a subband CQI, or a subband CQI with PMI. In some examples, the prioritizing at block 1510 may be performed for one or more types of uplink control information (e.g., top priority types, such as a rank indicator (RI), a precoding type indicator (PTI), or a wideband precoding matrix indicator (PMI) (e.g., reporting types of 3, 5, 6, 2a)). In another example, one or more type of uplink control information may not be prioritized by the prioritizing at block 1510, and the priority of the one or more type of uplink control information may be determined based at least in part on the serving cell index (e.g., a lower serving cell index may be assigned a higher priority) of each cell reporting the one or more type of uplink control information.

In some examples, the method 1500 may include determining the first cell is a cell that utilizes contention-free based radio frequency spectrum (e.g., radio frequency spectrum for which apparatuses do not contend for access because the radio frequency spectrum is licensed to particular users for particular uses). In these examples, and when the first uplink control information and the second uplink control information each include CSI, the reporting of the second uplink control information may be prioritized over the reporting of the second uplink control information despite a first reporting type of CSI for the first cell having a same priority level or higher priority level relative to a second reporting type of CSI for the second cell.

In certain examples of the method 1500, the first cell may be one of a first plurality of cells operating in contention-free based radio frequency spectrum, and/or the second cell may be one of a second plurality of cells operating in contention based radio frequency spectrum. In these examples, the method 1500 may in some cases include prioritizing the reporting of uplink control information so that the reporting of uplink control information for the second cell (or the second plurality of cells) is given priority over the reporting of uplink control information for the first cell (or the first plurality of cells). In other cases, the method 1500 may include classifying the second cell (or each cell of the second plurality of cells) as 1) a cell for which contention for the contention based radio frequency spectrum succeeded (e.g., a cell for which a valid measurement subframe containing an RS to be measured may have been transmitted, and for which a valid measurement or measurements may have been obtained for generating uplink control information), or 2) a cell for which contention for the contention based radio frequency spectrum failed (e.g., a cell for which a valid measurement subframe containing an RS to be measured would not have been transmitted, and for which a valid measurement or measurements would not have been obtained for generating uplink control information). In these latter examples of the method 1500, the reporting of uplink control information for any cell for which contention for contention based radio frequency spectrum to transmit a measurement subframe (e.g., a downlink subframe) succeeded may be given priority over the reporting of uplink control information for the first cell (or the first plurality of cells), and the reporting of uplink control information for the first cell (or the first plurality of cells) may be given priority over the reporting of uplink control information for any cell for which contention for contention based radio frequency spectrum to transmit a measurement subframe (e.g., a downlink subframe) failed.

In some examples of the method 1500, a cell index may be included with a reporting of the uplink control information. For example, a second cell index, identifying the second cell, may be included with a reporting of the second uplink control information. The included cell index may be used by a base station to determine the cell to which the uplink control information pertains. Alternately, a base station may use blind detection to determine the cell to which the uplink control information pertains. In one example, a maximum payload may be assumed for each cell, and a cell index may be included in a CSI report to indicate which cell is being reported, even though this may increase uplink overhead.

Thus, the method 1500 may provide for wireless communication. It should be noted that the method 1500 is just one implementation and that the operations of the method 1500 may be rearranged or otherwise modified such that other implementations are possible.

Figure 16:
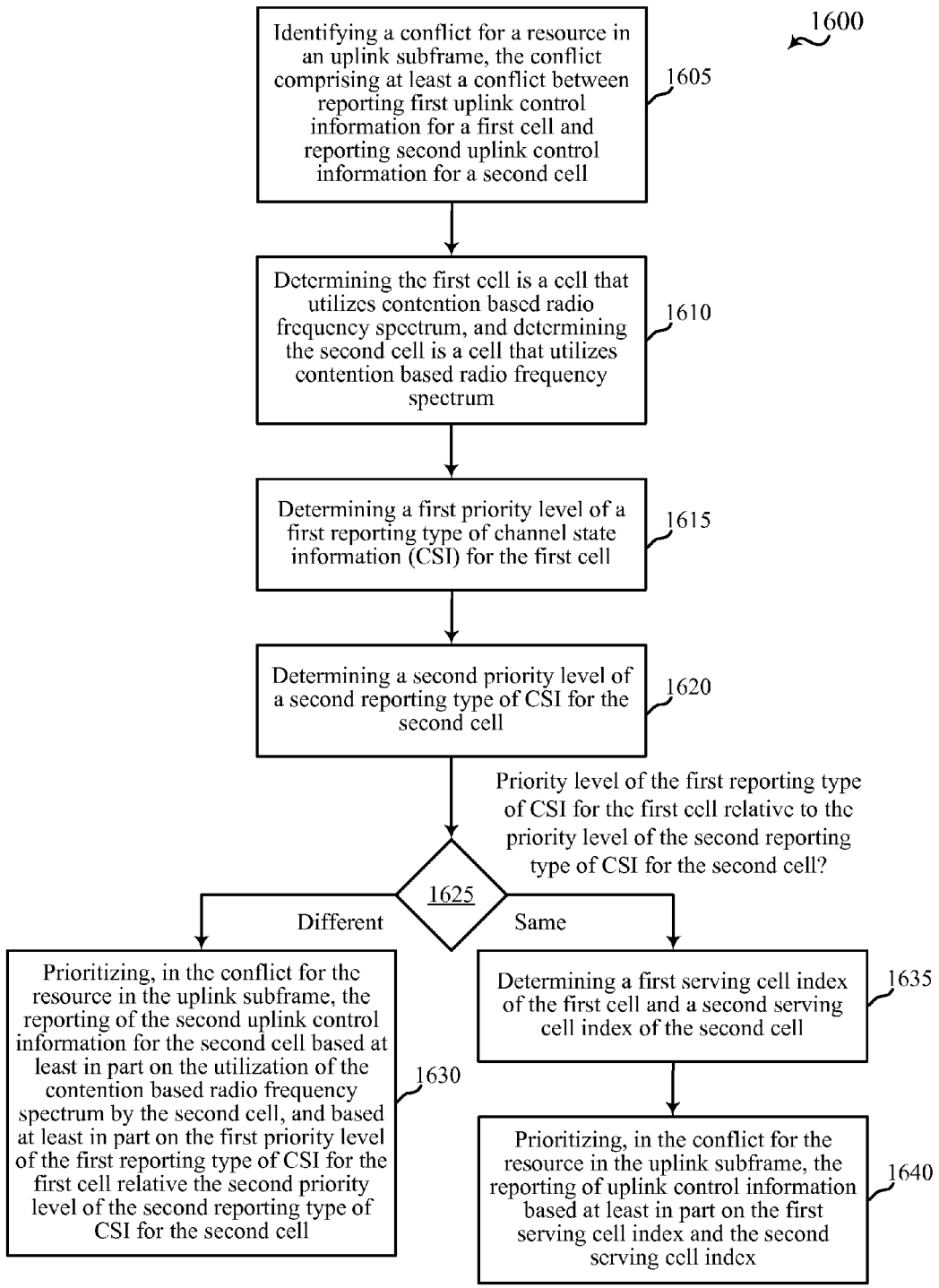
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the UEs 115, 215, 315, and/or 1415 described with reference to FIG. 1, 2, 3, and/or 14, and/or aspects of one or more of the apparatuses 1015, 1115, 1215, and/or 1315 described with reference to FIG. 10, 11, 12, and/or 13. In some examples, a UE such as one of the UEs 115, 215, 315, or 1415 or an apparatus such as one of the apparatuses 1015, 1115, 1215, or 1315 may execute one or more sets of codes to control the functional elements of the UE or apparatus to perform the functions described below.

At block 1605, the method 1600 may include identifying a conflict for a resource in an uplink subframe. The conflict may include at least a conflict between reporting first uplink control information for a first cell and reporting second uplink control information for a second cell. The first uplink control information and the second uplink control information may each include CSI. The operation(s) at block 1605 may be performed using the wireless communication management module 1020, 1120, 1220, 1320, and/or 1420 described with reference to FIG. 10, 11, 12, 13, and/or 14, and/or the resource conflict identifying module 1135, 1235, and/or 1335 described with reference to FIG. 11, 12, and/or 13.

At block 1610, the method 1600 may include determining the first cell is a cell that utilizes contention based radio frequency spectrum (e.g., radio frequency spectrum for which apparatuses contend for access because the radio frequency spectrum is open to unlicensed use). The method 1600 may also include determining the second cell is a cell that utilizes contention based radio frequency spectrum. The operation(s) at block 1610 may be performed using the wireless communication management module 1020, 1120, 1220, 1320, and/or 1420 described with reference to FIG. 10, 11, 12, 13, and/or 14, and/or the spectrum utilization determining module 1140, 1240, and/or 1340 described with reference to FIG. 11, 12, and/or 13.

At block 1615, the method 1600 may include determining a first priority level of a first reporting type of CSI for the first cell.

At block 1620, the method 1600 may include determining a second priority level of a second reporting type of CSI for the second cell.

In some examples, determining the first priority level of the first reporting type of CSI for the first cell, at block 1615, and determining the second priority level of the second reporting type of CSI for the second cell, at block 1620, may include: determining a top priority level when a reporting type of CSI includes at least one of a rank indicator (RI), a precoding type indicator (PTI), or a wideband precoding matrix indicator (PMI) (e.g., a reporting type of 3, 5, 6, or 2a); determining a medium priority level when a reporting type of CSI includes at least one of a wideband channel quality indication (CQI), or a wideband CQI with PMI (e.g., a reporting type of 2, 2b, 2c, or 4); and/or determining a low priority level when a reporting type of CSI includes at least one of a subband CQI, or a subband CQI with PMI (e.g., a reporting type of 1, 1a).

The operation(s) at block 1615 and/or block 1620 may be performed using the wireless communication management module 1020, 1120, 1220, 1320, and/or 1420 described with reference to FIG. 10, 11, 12, 13, and/or 14, and/or the CSI reporting type determining module 1245 described with reference to FIG. 12.

At block 1625, the method 1600 may include determining the priority level of the first reporting type of CSI for the first cell relative to the priority level of the second reporting type of CSI for the second cell.

At block 1630, and when the first priority level of the first reporting type of CSI differs from the second priority level of the first reporting type of CSI, the method 1600 may include prioritizing, in the conflict for the resource in the uplink subframe, the reporting of the second uplink control information for the second cell based at least in part on the utilization of the contention based radio frequency spectrum by the second cell, and based at least in part on the first priority level of the first reporting type of CSI for the first cell relative to the second priority level of the second reporting type of CSI for the second cell. In some examples, the reporting of the first uplink control information for the first cell and the reporting of the second uplink control information for the second cell may be prioritized over the reporting of a third uplink control information for a third cell, which third cell utilizes contention-free based radio frequency spectrum. The reporting of the first uplink control information for the first cell and the second uplink control information for the second cell may then be prioritized with respect to each other based at least in part on the first priority level of the first reporting type of CSI for the first cell relative to the second priority level of the second reporting type of CSI for the second cell.

At block 1635, and when the first priority level of the first reporting type of CSI and the second priority level of the second reporting type of CSI are a same priority level, the method 1600 may include determining a first serving cell index of the first cell and a second serving cell index of the second cell. At block 1640, the method 1600 may further include prioritizing, in the conflict for the resource in the uplink subframe, the reporting of uplink control information based at least in part on the utilization of the contention based radio frequency spectrum by the second cell, and based at least in part on the first serving cell index and the second serving cell index. In some examples, the reporting of the first uplink control information for the first cell and the reporting of the second uplink control information for the second cell may be prioritized over the reporting of a third uplink control information for a third cell, which third cell utilizes contention-free based radio frequency spectrum. The reporting of the first uplink control information for the first cell and the second uplink control information for the second cell may then be prioritized with respect to each other based on the first cell index and the second cell index. For example, when the second cell index is lower than the first serving cell index, the reporting of the second uplink control information for the second cell may be prioritized over the reporting of the first uplink control information for the first cell; and when the second cell index is higher than the first serving cell index, the reporting of the first uplink control information for the first cell may be prioritized over the reporting of the second uplink control information for the second cell.

The operation(s) at block 1630 and/or block 1640 may be performed using the wireless communication management module 1020, 1120, 1220, 1320, and/or 1420 described with reference to FIG. 10, 11, 12, 13, and/or 14, and/or the information prioritizing module 1145, 1250, and/or 1350 described with reference to FIG. 11, 12, and/or 13. The operation(s) at block 1635 may be performed using the wireless communication management module 1020, 1120, 1220, 1320, and/or 1420 described with reference to FIG. 10, 11, 12, 13, and/or 14, and/or the serving cell index determining module 1255 described with reference to FIG. 12.

In some examples of the method 1600, the first cell and the second cell may be of different carrier frequencies, as might be found in a carrier aggregation and/or dual-connectivity (e.g., multiflow) mode of communication. In other examples of the method 1600, the first cell and the second cell may be of a same carrier frequency, as might be found in a CoMP mode of communication.

In some examples of the method 1600, a cell index may be included with a reporting of the uplink control information. For example, a second cell index, identifying the second cell, may be included with a reporting of the second uplink control information. The included cell index may be used by a base station to determine the cell to which the uplink control information pertains. Alternately, a base station may use blind detection to determine the cell to which the uplink control information pertains. In one example, a maximum payload may be assumed for each cell, and a cell index may be included in a CSI report to indicate which cell is being reported, even though this may increase uplink overhead.

Thus, the method 1600 may provide for wireless communication. It should be noted that the method 1600 is just one implementation and that the operations of the method 1600 may be rearranged or otherwise modified such that other implementations are possible.

Figure 17:
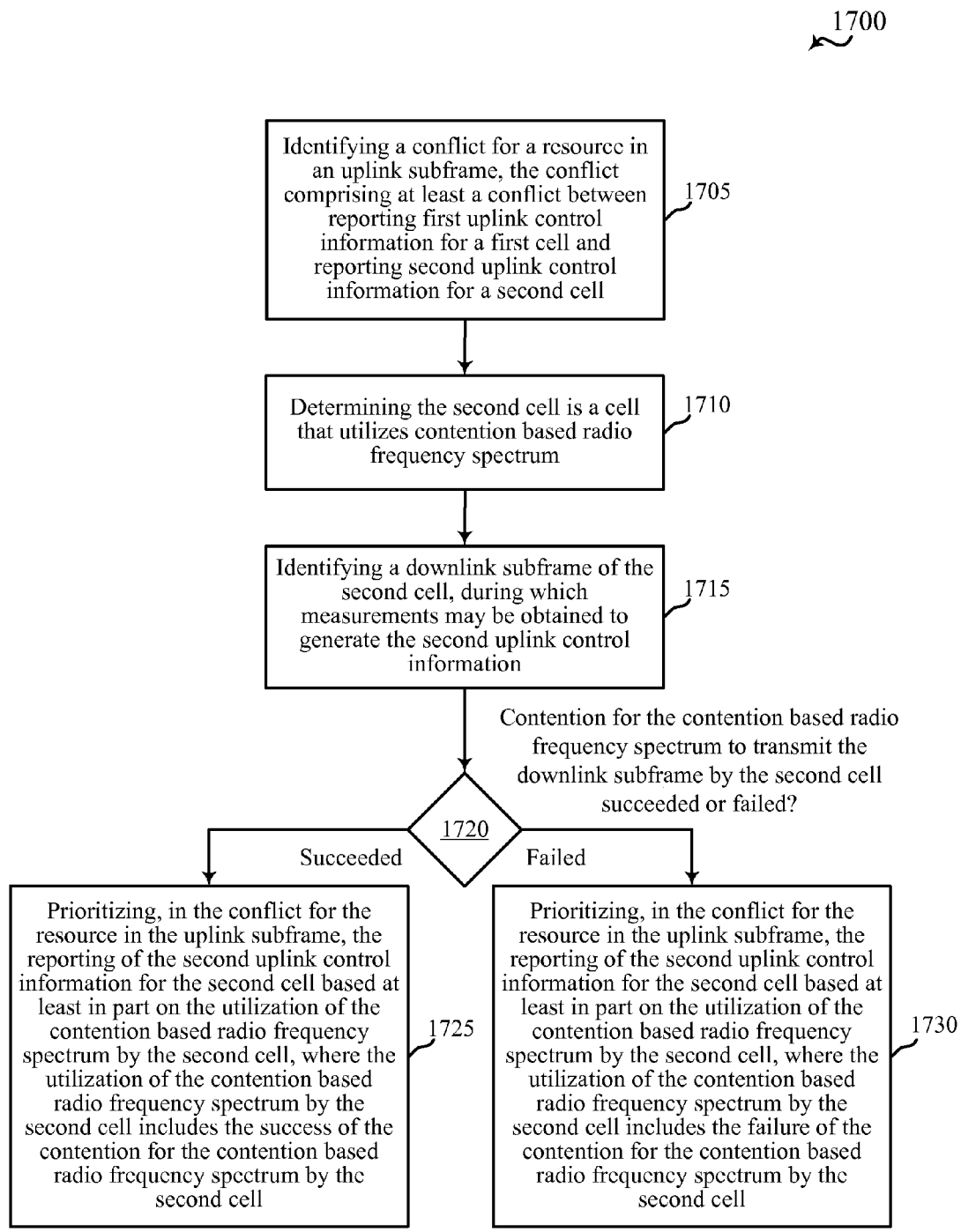
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the UEs 115, 215, 315, and/or 1415 described with reference to FIG. 1, 2, 3, and/or 14, and/or aspects of one or more of the apparatuses 1015, 1115, 1215, and/or 1315 described with reference to FIG. 10, 11, 12, and/or 13. In some examples, a UE such as one of the UEs 115, 215, 315, or 1415 or an apparatus such as one of the apparatuses 1015, 1115, 1215, or 1315 may execute one or more sets of codes to control the functional elements of the UE or apparatus to perform the functions described below.

At block 1705, the method 1700 may include identifying a conflict for a resource in an uplink subframe. The conflict may include at least a conflict between reporting first uplink control information for a first cell and reporting second uplink control information for a second cell. The operation (s) at block 1705 may be performed using the wireless communication management module 1020, 1120, 1220, 1320, and/or 1420 described with reference to FIG. 10, 11, 12, 13, and/or 14, and/or the resource conflict identifying module 1135, 1235, and/or 1335 described with reference to FIG. 11, 12, and/or 13.

At block 1710, the method 1700 may include determining the second cell is a cell that utilizes contention based radio frequency spectrum (e.g., radio frequency spectrum for which apparatuses contend for access because the radio frequency spectrum is open to unlicensed use). The operation(s) at block 1710 may be performed using the wireless communication management module 1020, 1120, 1220, 1320, and/or 1420 described with reference to FIG. 10, 11, 12, 13, and/or 14, and/or the spectrum utilization determining module 1140, 1240, and/or 1340 described with reference to FIG. 11, 12, and/or 13.

At block 1715, the method 1700 may include identifying a downlink subframe of the second cell. The downlink subframe may be a subframe during which measurements may be obtained to generate the second uplink control information.

At block 1720, the method 1700 may include determining whether contention for the contention based radio frequency spectrum to transmit the downlink subframe succeeded or failed. The determination at block 1720 may in some cases be made based on signaling received from a base station, which signaling indicates the success or failure of contention for the contention based radio frequency spectrum to transmit the downlink subframe by the second cell. The determination at block 1720 may in other cases be made based on the presence of a reference signal (e.g., the CUBS 545 described with reference to FIG. 5A and/or one or more other signals) transmitted by the second cell, which reference signal indicates the success or failure of contention for the contention based radio frequency spectrum to transmit the downlink subframe by the second cell. For example, when the reference signal is detected as present, contention for the contention based radio frequency spectrum to transmit the downlink subframe may be determined to have succeeded. In contrast, when the reference signal is not detected as present, contention for the contention based radio frequency spectrum to transmit the downlink subframe may be determined to have failed. The signaling and/or reference signal transmission of the base station helps to align the base station and a UE or apparatus performing the method 1700 with respect to which cell a report of uplink control information corresponds. Alignment may also be based on blind detection, by a base station, of the cell to which uplink control information corresponds, and/or based on the signaling of contention success status information by the base station.

The operation(s) at block 1720 may be performed using the wireless communication management module 1020, 1120, 1220, 1320, and/or 1420 described with reference to FIG. 10, 11, 12, 13, and/or 14, and/or the contention success determining module 1345 described with reference to FIG. 13.

By determining whether a report of uplink control information (e.g., a CSI feedback instance) is under a valid measurement subframe (e.g., the downlink subframe identified at block 1715), more advanced rules for prioritizing the reporting of uplink control information may be developed. For example, when it is determined at block 1720 that contention for the contention based radio frequency spectrum to transmit the downlink subframe succeeded (and thus, a valid measurement subframe containing an RS to be measured may have been transmitted, and a valid measurement or measurements may have been obtained for generating uplink control information), the method 1700 may proceed to block 1725. At block 1725, the method 1700 may include prioritizing, in the conflict for the resource in the uplink subframe, the reporting of the second uplink control information for the second cell based at least in part on the utilization of the contention based radio frequency spectrum by the second cell, where the utilization of the contention based radio frequency spectrum by the second cell includes the success of the contention for the contention based radio frequency spectrum by the second cell. For example, when the first cell is a cell that utilizes contention-free based radio frequency spectrum, the reporting of the second uplink control information for the second cell may be given a higher priority than the reporting of the first uplink control information for the first cell. When the first cell is a cell that utilizes contention based radio frequency spectrum, the reporting of the second uplink control information for the second cell may be given a higher priority than the reporting of third uplink control information for a third cell that utilizes contention-free based radio frequency spectrum, and may be given a priority with respect to the reporting of the first uplink control information for the first cell based on the success or failure of the first cell to contend for the contention based radio frequency spectrum and transmit a downlink subframe (and/or based on a first priority level of a first reporting type of CSI for the first cell relative to a second priority level of a second reporting type of CSI for the second cell, and/or based on a comparison of a first serving cell for the first cell and a second serving cell index for the second cell).

When it is determined at block 1720 that contention for the contention based radio frequency spectrum to transmit the downlink subframe failed (and thus, a valid measurement subframe containing an RS to be measured would not have been transmitted, and a valid measurement or measurements would not have been obtained for generating uplink control information), the method 1700 may proceed to block 1730. At block 1730, the method 1700 may include prioritizing, in the conflict for the resource in the uplink subframe, the reporting of the second uplink control information for the second cell based at least in part on the utilization of the contention based radio frequency spectrum by the second cell, where the utilization of the contention based radio frequency spectrum by the second cell includes the failure of the contention for the contention based radio frequency spectrum by the second cell. In some cases, the prioritizing may include giving the reporting of the second uplink control information for the second cell priority over the reporting of uplink control information for one or more cells that utilizes contention-free based radio frequency spectrum. In other cases, the prioritizing may include lowering a priority of the reporting of the second uplink control information for the second cell. The priority of the reporting of the second uplink control information for the second cell may in some cases be lowered such that the priority of reporting the second uplink control information for the second cell is lower than the priority of reporting uplink control information for one or more cells that utilize contention-free based spectrum and/or lower than the priority of reporting uplink control information for one or more cells that utilize contention based spectrum and have a higher serving cell index than the second cell. In other cases, the second uplink control information for the second cell may not be reported, and the reporting of the second uplink control information for the second cell may be omitted from the prioritizing of reporting other uplink control information. In other cases, the method 1700 may include accessing historic second uplink control information for the second cell. The historic second uplink control information for the second cell may be based on measurements obtained during receipt of a previous downlink subframe (e.g., a previous valid downlink subframe). In these cases, the prioritizing that occurs at block 1730 may be similar to the prioritizing that occurs at block 1725, with the prioritizing of the second uplink control information for the second cell including the prioritizing of the historic second uplink control information for the second cell. Alternately, the reporting of the historic second uplink control information for the second cell may be given a lower priority than the reporting of the uplink control information for the first cell.

The operation(s) at block 1725 and/or 1730 may be performed using the wireless communication management module 1020, 1120, 1220, 1320, and/or 1420 described with reference to FIG. 10, 11, 12, 13, and/or 14, and/or the information prioritizing module 1145, 1250, and/or 1350 described with reference to FIG. 11, 12, and/or 13. The accessing of the historic second uplink control information may be performed using the wireless communication management module 1020, 1120, 1220, 1320, and/or 1420 described with reference to FIG. 10, 11, 12, 13, and/or 14, and/or the historic uplink control information module 1355 described with reference to FIG. 13.

In some examples of the method 1700, the first cell and the second cell may be of different carrier frequencies, as might be found in a carrier aggregation and/or dual-connectivity (e.g., multiflow) mode of communication. In other examples of the method 1700, the first cell and the second cell may be of a same carrier frequency, as might be found in a CoMP mode of communication.

In some examples of the method 1700, the first uplink control information and/or the second uplink control information may include CSI, an SRS, and/or an SR control information (e.g., under multiflow operation). When uplink control information includes CSI, the CSI may include, for example, at least one of an RI, a PTI, a wideband PMI, a wideband CQI, a wideband CQI with PMI, a subband CQI, or a subband CQI with PMI. In some examples, the prioritizing at block 1725 and/or 1730 may be performed for one or more types of uplink control information (e.g., top priority types, such as a rank indicator (RI), a precoding type indicator (PTI), or a wideband precoding matrix indicator (PMI) (e.g., reporting types of 3, 5, 6, 2a)). In another example, one or more type of uplink control information may not be prioritized by the prioritizing at block 1725 and/or 1730, and the priority of the one or more type of uplink control information may be determined based at least in part on the serving cell index (e.g., a lower serving cell index may be assigned a higher priority) of each cell reporting the one or more type of uplink control information.

In some examples of the method 1700, a cell index may be included with a reporting of the uplink control information. For example, a second cell index, identifying the second cell, may be included with a reporting of the second uplink control information. The included cell index may be used by a base station to determine the cell to which the uplink control information pertains. For example, the cell index may be used by the base station to determine the cell to which the uplink control information pertains when a UE performing the method 1700 and the base station are aligned. The alignment of the UE and the base station may be important when determining whether the cell using the contention based radio frequency spectrum is successful contending for access of the contention based radio frequency spectrum. The determination of whether the cell using the contention based radio frequency spectrum is successful contending for access of the contention based radio frequency spectrum may be based at least in part on signaling and/or reference signaling (CUBS 545 and/or CCA Exempt Transmission (CET) signaling). When the UE and the base station are aligned, the probability of detecting the signaling and/or reference signaling may be reliable (e.g., above a probability threshold). However, when the UE and the base station are not aligned, the probability of detecting the signaling and/or reference signaling may not be reliable (e.g., below a probability threshold). When the UE and the base station are not aligned, a base station may use blind detection to determine the cell to which the uplink control information pertains. In one example, a maximum payload may be assumed for each cell, and a cell index may be included in a CSI report to indicate which cell is being reported, even though this may increase uplink overhead.

Thus, the method 1700 may provide for wireless communication. It should be noted that the method 1700 is just one implementation and that the operations of the method 1700 may be rearranged or otherwise modified such that other implementations are possible.

In some examples, one or more aspects of the methods 1500, 1600, and/or 1700 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
    identifying a conflict for a resource in an uplink subframe, the conflict comprising at least a conflict between reporting first uplink control information for a first cell and reporting second uplink control information for a second cell;
    prioritizing, in the conflict for the resource in the uplink subframe, the reporting of uplink control information based at least in part on whether at least one of the first cell and the second cell utilizes a contention based radio frequency spectrum; and
    transmitting uplink control information based on the prioritization.

2. The method of claim 1, further comprising:
    determining the second cell is a cell that utilizes contention based radio frequency spectrum; and
    prioritizing, in the conflict for the resource in the uplink subframe, the reporting of the second uplink control information for the second cell based at least in part on the utilization of the contention based radio frequency spectrum by the second cell.

3. The method of claim 1, wherein the first cell and the second cell are of different carrier frequencies.

4. The method of claim 1, wherein the first cell and the second cell are of a same carrier frequency.

5. The method of claim 1, wherein the first uplink control information and the second uplink control information each comprise channel state information (CSI).

6. The method of claim 5, wherein a first priority level of a first reporting type of CSI for the first cell and a second priority level of a second reporting type of CSI for the second cell are a same priority level.

7. The method of claim 5, further comprising:
    determining a first priority level of a first reporting type of CSI for the first cell;
    determining a second priority level of a second reporting type of CSI for the second cell; and
    prioritizing, in the conflict for the resource in the uplink subframe, the reporting of one of the first uplink control information and the second uplink control information based at least in part on the first priority level of the first reporting type of CSI for the first cell relative to the second priority level of the second reporting type of CSI for the second cell.

8. The method of claim 7, wherein the first reporting type of CSI for the first cell has a higher priority level than the second reporting type of CSI for the second cell, the method further comprising:
    prioritizing, in the conflict for the resource in the uplink subframe, the reporting of the first uplink control information for the first cell over the reporting of the second uplink control information for the second cell.

9. The method of claim 7, wherein determining the first priority level of the first reporting type of CSI for the first cell and determining the second priority level of the second reporting type of CSI for the second cell comprises:
    determining a top priority level when a reporting type of CSI comprises at least one of a rank indicator (RI), a precoding type indicator (PTI), or a wideband precoding matrix indicator (PMI);
    determining a medium priority level when the reporting type of CSI comprises at least one of a wideband channel quality indication (CQI), or a wideband CQI with PMI; and
    determining a low priority level when the reporting type of CSI comprises at least one of a subband CQI, or a subband CQI with PMI.

10. The method of claim 1, further comprising:
    determining the first cell is a cell that utilizes contention based spectrum;
    determining a first serving cell index of the first cell and a second serving cell index of the second cell, the second serving cell index being lower than the first serving cell index; and
    prioritizing, in the conflict for the resource in the uplink subframe, the reporting of the second uplink control information for the second cell based at least in part on the first serving cell index and the second serving cell index.

11. The method of claim 1, further comprising:
identifying a downlink subframe of the second cell, during which measurements are obtained to generate the second uplink control information.

12. The method of claim 11, further comprising:
lowering a priority of the reporting of the second uplink control information for the second cell when it is determined that a contention for the contention based radio frequency spectrum to transmit the downlink subframe failed.

13. The method of claim 11, wherein prioritizing the reporting of the second uplink control information for the second cell comprises prioritizing the reporting of historic second uplink control information for the second cell, based on measurements obtained during receipt of a previous downlink subframe, when it is determined that a contention for the contention based radio frequency spectrum to transmit the downlink subframe failed.

14. The method of claim 1, further comprising:
including a second cell index with a reporting of the second uplink control information, the second cell index identifying the second cell.

15. The method of claim 1, further comprising:
receiving signaling from a base station indicating a success or failure of a contention for the contention based radio frequency spectrum to transmit a downlink subframe by the second cell.

16. The method of claim 1, further comprising:
detecting a success or failure of a contention for the contention based radio frequency spectrum to transmit a downlink subframe by the second cell, wherein the detection is performed based on a presence of a reference signal transmitted by the second cell.

17. The method of claim 1, further comprising:
determining a type of the first uplink control information and the type of the second uplink control information; and
prioritizing, in the conflict, the reporting of a subset of uplink control information based at least in part on the type of the first uplink control information and the type of the second uplink control information.

18. The method of claim 1, further comprising:
determining the first cell is a cell that utilizes contention-free based radio frequency spectrum.

19. The method of claim 1, wherein the first uplink control information and the second uplink control information comprise sounding reference signals (SRS).

20. The method of claim 1, wherein the first uplink control information and the second uplink control information comprise scheduling request (SR) control information.

21. An apparatus for wireless communication, comprising:
means for identifying a conflict for a resource in an uplink subframe, the conflict comprising at least a conflict between reporting first uplink control information for a first cell and reporting second uplink control information for a second cell;
means for prioritizing, in the conflict for the resource in the uplink subframe, the reporting of uplink control information based at least in part on whether at least one of the first cell and the second cell utilizes a contention based radio frequency spectrum; and
means for transmitting uplink control information based on the prioritization.

22. The apparatus of claim 21, further comprising:
means for determining the second cell is a cell that utilizes contention based radio frequency spectrum; and
means for prioritizing, in the conflict for the resource in the uplink subframe, the reporting of the second uplink control information for the second cell based at least in part on the utilization of the contention based radio frequency spectrum by the second cell.

23. The apparatus of claim 21, further comprising:
means for determining the first cell is a cell that utilizes contention based spectrum;
means for determining a first serving cell index of the first cell and a second serving cell index of the second cell, the second serving cell index being lower than the first serving cell index; and
means for prioritizing, in the conflict for the resource in the uplink subframe, the reporting of the second uplink control information for the second cell based at least in part on the first serving cell index and the second serving cell index.

24. The apparatus of claim 21, further comprising:
means for receiving signaling from a base station indicating a success or failure of a contention for the contention based radio frequency spectrum to transmit a downlink subframe by the second cell.

25. The apparatus of claim 21, further comprising:
means for detecting a success or failure of a contention for the contention based radio frequency spectrum to transmit a downlink subframe by the second cell, wherein the detection is performed based on a presence of a reference signal transmitted by the second cell.

26. An apparatus for wireless communication, comprising:
a processor;
memory in electronic communication with the processor; and
instructions stored in the memory, the instructions being executable by the processor to:
identify a conflict for a resource in an uplink subframe, the conflict comprising at least a conflict between reporting first uplink control information for a first cell and reporting second uplink control information for a second cell;
prioritize, in the conflict for the resource in the uplink subframe, the reporting of uplink control information based at least in part on whether at least one of the first cell and the second cell utilizes a contention based radio frequency spectrum; and
transmit uplink control information based on the prioritization.

27. The apparatus of claim 26, wherein the first uplink control information and the second uplink control information each comprise channel state information (CSI).

28. The apparatus of claim 26, wherein the instructions are executable by the processor to:
determine a first serving cell index of the first cell and a second serving cell index of the second cell, the second serving cell index being higher than the first serving cell index; and
prioritize, in the conflict for the resource in the uplink subframe, the reporting of the second uplink control information for the second cell based at least in part on the first serving cell index and the second serving cell index.

29. The apparatus of claim 26, wherein the instructions are executable by the processor to:

identify a downlink subframe of the second cell, during which measurements are obtained to generate the second uplink control information.

30. A non-transitory computer-readable medium storing computer-executable code for wireless communication, the code executable by a processor to:
- identify a conflict for a resource in an uplink subframe, the conflict comprising at least a conflict between reporting first uplink control information for a first cell and reporting second uplink control information for a second cell;
- prioritize, in the conflict for the resource in the uplink subframe, the reporting of uplink control information based at least in part on whether at least one of the first cell and the second cell utilizes a contention based radio frequency spectrum; and
- transmit uplink control information based on the prioritization.

* * * * *